(12) United States Patent
Tamura

(10) Patent No.: US 10,649,934 B2
(45) Date of Patent: May 12, 2020

(54) IMAGE PROCESSING APPARATUS, NOTIFICATION MONITORING PROGRAM, AND NOTIFICATION MONITORING METHOD

(71) Applicant: FUJITSU LIMITED, Kawasaki-shi, Kanagawa (JP)

(72) Inventor: Yuto Tamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 166 days.

(21) Appl. No.: 15/441,281

(22) Filed: Feb. 24, 2017

(65) Prior Publication Data

US 2017/0262392 A1  Sep. 14, 2017

(30) Foreign Application Priority Data

Mar. 14, 2016  (JP) .................................. 2016-049108

(51) Int. Cl.
| | | |
|---|---|---|
| G06F 13/22 | (2006.01) | |
| G06F 13/24 | (2006.01) | |
| G06F 13/40 | (2006.01) | |
| H04N 1/32 | (2006.01) | |

(52) U.S. Cl.
CPC .............. *G06F 13/22* (2013.01); *G06F 13/24* (2013.01); *G06F 13/4068* (2013.01); *H04N 1/32032* (2013.01)

(58) Field of Classification Search
CPC ....... G06F 13/22; G06F 13/24; G06F 13/4068
USPC ....................................... 710/18, 44, 46, 109
See application file for complete search history.

(56) References Cited

U.S. PATENT DOCUMENTS

| 4,751,630 A | 6/1988 | Kelly, Jr. et al. | |
|---|---|---|---|
| 5,414,858 A * | 5/1995 | Hoffman | G06F 13/22 |
| | | | 340/3.4 |
| 6,449,663 B1 * | 9/2002 | Carney | G06F 13/22 |
| | | | 370/449 |
| 6,542,495 B1 * | 4/2003 | Sugita | H04L 12/40058 |
| | | | 370/347 |
| 9,753,676 B1 * | 9/2017 | Panda | G06F 3/1229 |
| 2010/0134844 A1 * | 6/2010 | Ito | G06K 15/02 |
| | | | 358/1.17 |

(Continued)

FOREIGN PATENT DOCUMENTS

| JP | S63-158655 A | 7/1988 |
|---|---|---|
| JP | 7-282090 A | 10/1995 |

(Continued)

OTHER PUBLICATIONS

Izumidani, et al., "LAN Technical Explanation to Ethernet and FDDI" Software Research Center, Jun. 20, 1993, first edition, pp. 43-44, with English Abstract and English Translation of Cited in Japanese Office Action dated Oct. 15, 2019 issued for corresponding Japanese Application No. 2016-049108.

(Continued)

*Primary Examiner* — Farley Abad
*Assistant Examiner* — Henry W Yu
(74) *Attorney, Agent, or Firm* — Fujitsu Patent Center

(57) ABSTRACT

An information processing apparatus includes a memory; and a processor coupled to the memory and the processor configured to poll and monitor a plurality of monitoring targets, wherein the number of times of monitoring a first monitoring target is greater than the number of times of monitoring a second monitoring target.

8 Claims, 17 Drawing Sheets

(56) References Cited

U.S. PATENT DOCUMENTS

| | | | | |
|---|---|---|---|---|
| 2011/0103316 A1* | 5/2011 | Ulupinar | ............... | H04L 47/10 |
| | | | | 370/329 |
| 2011/0244903 A1* | 10/2011 | Sagae | ................ | H04W 48/10 |
| | | | | 455/507 |
| 2012/0030729 A1* | 2/2012 | Schwartz | ........... | G06Q 10/0633 |
| | | | | 726/1 |
| 2017/0068708 A1* | 3/2017 | Bottomley | ........ | G06F 16/24552 |

FOREIGN PATENT DOCUMENTS

| | | |
|---|---|---|
| JP | 2000-10823 A | 1/2000 |
| JP | 2001-325123 A | 11/2001 |
| JP | 2006-323752 A | 11/2006 |

OTHER PUBLICATIONS

Japanese Office Action dated Oct. 15, 2019 for corresponding Japanese Application No. 2016-049108, with English Translation, 9 pages.

\* cited by examiner

FIG.9

| | PRIORITY COEFFICIENT | NUMBER OF TIMES OF APPEARANCE |
|---|---|---|
| NOTIFICATION A RECEIVING AREA | 0.43 | 34.4 → 34 |
| NOTIFICATION B RECEIVING AREA | 0.01 | 0.8 → 0 |
| ⋮ | ⋮ | ⋮ |
| ⋮ | ⋮ | ⋮ |
| NOTIFICATION E RECEIVING AREA | 0.03 | 2.4 → 2 |

FIG.11

| H3 | 121 PRIORITY COEFFICIENT | NUMBER OF TIMES OF APPEARANCE | NUMBER OF STEPS |
|---|---|---|---|
| NOTIFICATION A RECEIVING AREA | 0.5 | 5 | 2 |
| NOTIFICATION B RECEIVING AREA | 0.4 | 4 | 3 |
| NOTIFICATION C RECEIVING AREA | 0.1 | 1 | 10 |

FIG.16

| H4 | PRIORITY COEFFICIENT | NUMBER OF TIMES OF APPEARANCE | NUMBER OF STEPS |
|---|---|---|---|
| NOTIFICATION A RECEIVING AREA | 0.3 | 3 | 4 |
| NOTIFICATION B RECEIVING AREA | 0.2 | 2 | 5 |
| NOTIFICATION C RECEIVING AREA | 0.1 | 1 | 10 |
| POWER SAVING DEGREE | 0.4 | 4 (NUMBER OF TIMES OF NOPs) | 3 |

121

IMAGE PROCESSING APPARATUS, NOTIFICATION MONITORING PROGRAM, AND NOTIFICATION MONITORING METHOD

CROSS-REFERENCE TO RELATED APPLICATION

This application is based upon and claims the benefit of priority of the prior Japanese Patent Application No. 2016-049108, filed on Mar. 14, 2016, the entire contents of which are incorporated herein by reference.

FIELD

The present invention relates to an image processing apparatus, a notification monitoring program, and a notification monitoring method.

BACKGROUND

An information processing apparatus performs monitoring based on a polling system, for example, to control processing among a plurality of apparatuses or among a plurality of processes. According to the polling system, the information processing apparatus periodically sends an inquiry to each monitoring target corresponding to a process or an apparatus, and executes a predetermined processing (hereafter called response processing) in accordance with the inquiry result.

If there are a plurality of monitoring targets based on polling, the information processing cyclically monitors the plurality of monitoring targets on a regular basis. Therefore if there is a plurality of monitoring targets, each of the plurality of monitoring targets has an equal number of times of monitoring based on polling.

In some cases, the monitoring target may change immediately after monitoring based on polling. In this case, the information processing apparatus detects the change that occurred to this monitoring target in the next cycle of monitoring after monitoring the rest of the monitoring targets. This means that when there are many monitoring targets, the time from the occurring of a change in the monitoring target to the detection of this change becomes long, and a response time to be taken unto execution of response processing becomes long.

Therefore it was proposed that a priority is assigned to each monitoring target, so that the monitoring frequency of a monitoring target having a high priority is increased.

The technique to control processing based on priority after a message arrived is disclosed in, for example, Japanese Laid-open Patent. Publication No. S63-158655 and Japanese Laid-open Patent Publication No. 2006-323752.

SUMMARY

However, in the case when one process monitors a plurality of monitoring targets based on polling in the information processing apparatus, a monitoring frequency is the same for all of the plurality of monitoring targets. Therefore time to detect a change of a monitoring target is the same for all of the monitoring targets, and the response time to be taken until executing the response processing in accordance with the change, is the same for all of the monitoring targets as well.

According to an aspect of the embodiments, an information processing apparatus includes a memory; and a processor coupled to the memory and the processor configured to poll and monitor a plurality of monitoring targets, wherein the number of times of monitoring a first monitoring target is greater than the number of times of monitoring a second monitoring target.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a table describing the outline of the processing of step S13 in FIG. 8.

FIG. 11 is a first drawing for explaining an example of the processing by the notification monitoring program 120 according to Embodiment 1.

FIG. 16 is a table for explaining an example of the processing by the notification monitoring program 120 according to Embodiment 2.

DESCRIPTION OF EMBODIMENTS

Embodiments will be described hereinafter according to the drawings. However, it is noted that the technical scope is not limited to the embodiments described below, but covers the matters described in the claims and the equivalents thereof.

[Polling]

Figure 1:
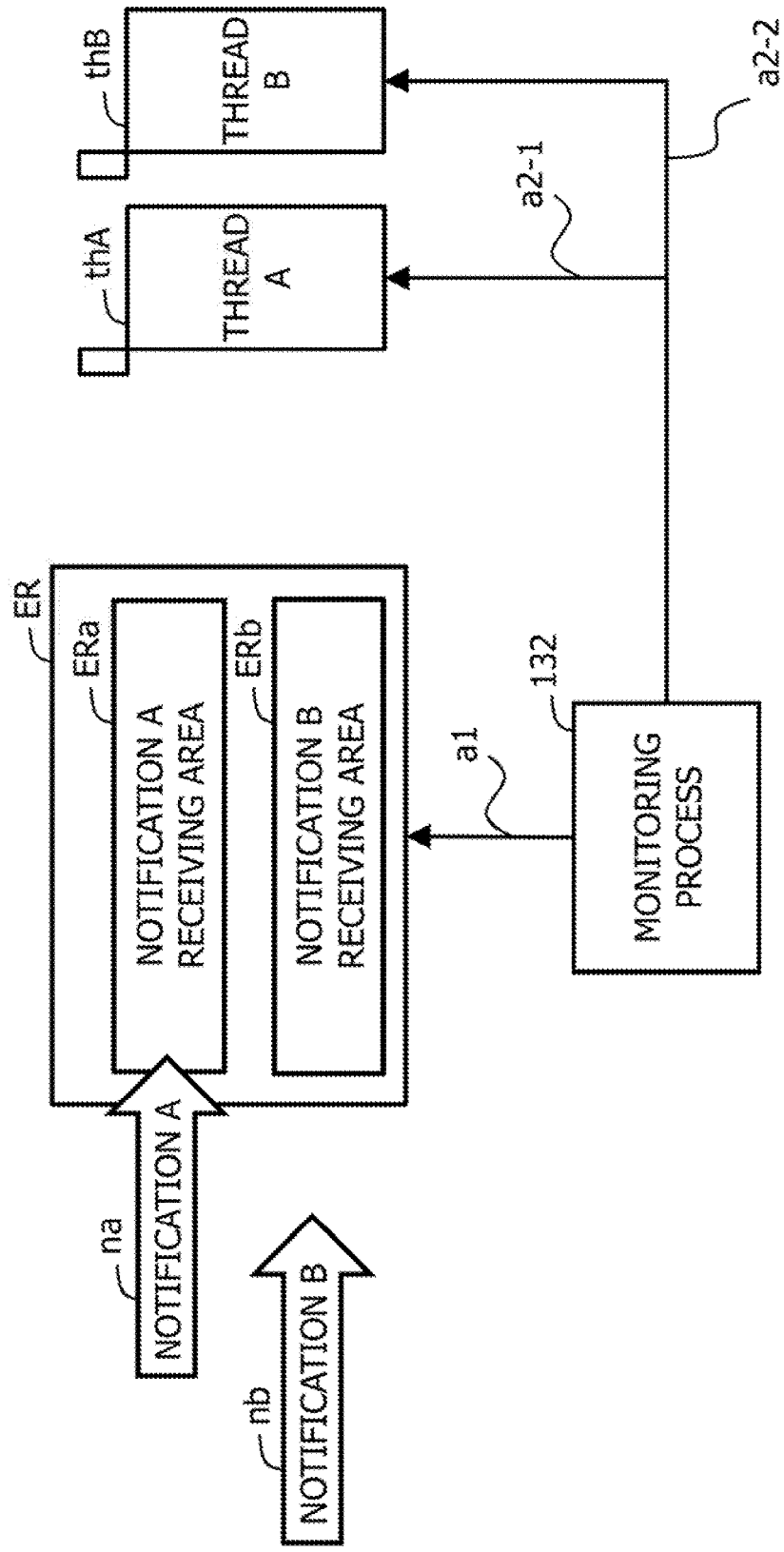
FIG. 1 is a diagram depicting an example of monitoring based on polling.

FIG. 1 is a diagram depicting an example of monitoring based on polling. In an information processing apparatus 100 according to this embodiment depicted in FIG. 1, a monitoring process 132 and a plurality of threads thA and thB in standby state operate. The threads thA and thB will be described later. The information processing apparatus 100 in FIG. 1 includes a notification receiving area ER in memory.

The notification receiving area ER depicted in FIG. 1 is a target of monitoring based on polling (monitoring target). The notification receiving area ER is, for example, an area of receiving notification by another process or another terminal apparatus. The notification is, for example, such data as information to indicate a flag or a message.

A monitoring target is not limited to the examples of FIG. 1. A monitoring target may be: a predetermined data area in which transmission/reception data, binary data and the like, generated in another process or another terminal apparatus, are updated; a directory area in which files are stored; and a queue, for example.

The monitoring process 132 depicted in FIG. 1 polls and monitors the notification receiving area ER on a regular basis (a1). For example, the monitoring process 132 accesses the notification receiving area ER and checks whether the notification receiving area ER has changed to a predetermined state. If it is detected that the notification receiving area ER has changed to the predetermined state, the monitoring process 132 executes a predetermined processing corresponding to the monitoring target (also called response processing) (a2-1, a2-2).

The predetermined state is a state that is determined in advance. In the case of the example in FIG. 1, the predetermined state is a state where the notification receiving area ER has been updated by the notified information. The predetermined state may be a state where a predetermined data area has been updated by the transmitted/received data, or a state where files have been generated in the directory area, for example.

A concrete description follows. The notification receiving area ER in FIG. 1 includes a notification A receiving area ERa and a notification B receiving area ERb. Each of the notification A receiving area ERa and the notification B receiving area ERb depicted in FIG. 1 is a 1-byte area, for example. The notification A receiving area ERa is an area that receives a notification Ana, which is 1-byte data, and the notification B receiving area ERb is an area that receives a notification Bnb, which is 1-byte data.

A process A (not illustrated) that operates in the information processing apparatus 100 updates the notification A receiving area ERa by the information of the notification Ana. A process B (not illustrated) that operates in the information processing apparatus 100 updates the notification B receiving area ERb by the information of the notification Bnb. The monitoring process 132 cyclically checks whether the notification A receiving area ERa has been updated by the notification Ana, and the notification B receiving area ERb has been updated by notification Bnb (a1), on a regular basis. In other words, the monitoring process 132 determines whether the monitoring target has changed to a predetermined state on a regular basis.

When it is detected that the notification A receiving area ERa has been updated by the notification Ana, the monitoring process 132 executes the processing corresponding to notification Ana as the response processing (a2-1). The response processing corresponding to the notification A receiving area ERa is, for example, an instruction to clear the standby state of the thread thA, which executes a processing related to the process A. In the same way, when it is detected that the notification B receiving area ERb is updated by the notification Bnb, the monitoring process 132, for example, instructs to clear the standby state of the thread thB, which executes a processing related to the process B, as the response processing (a2-2).

By polling and monitoring the notification A receiving area ERa and the notification B receiving area ERb and executing the response processing in accordance with the monitoring result like this, the monitoring process 132 controls the processing of the process A and process B.

The response processing corresponding to the monitoring target is not limited to clearing the standby state of the threads thA and thB. The response processing may be, for example, execution of a sub-routine of the monitoring process 132, transmission/reception of a message, or a startup of an execution file.

FIG. 1 is a case when the information processing apparatus 100, in which the monitoring process 132 operates, holds the notification receiving areas ER. The notification receiving areas ER may be held in another information processing apparatus (not illustrated), or in memory of another terminal apparatus (not illustrated), for example. The notification receiving areas ER may also be held in a storage medium or the like which the monitoring process 132 can access.

Comparative Example

Figure 2:
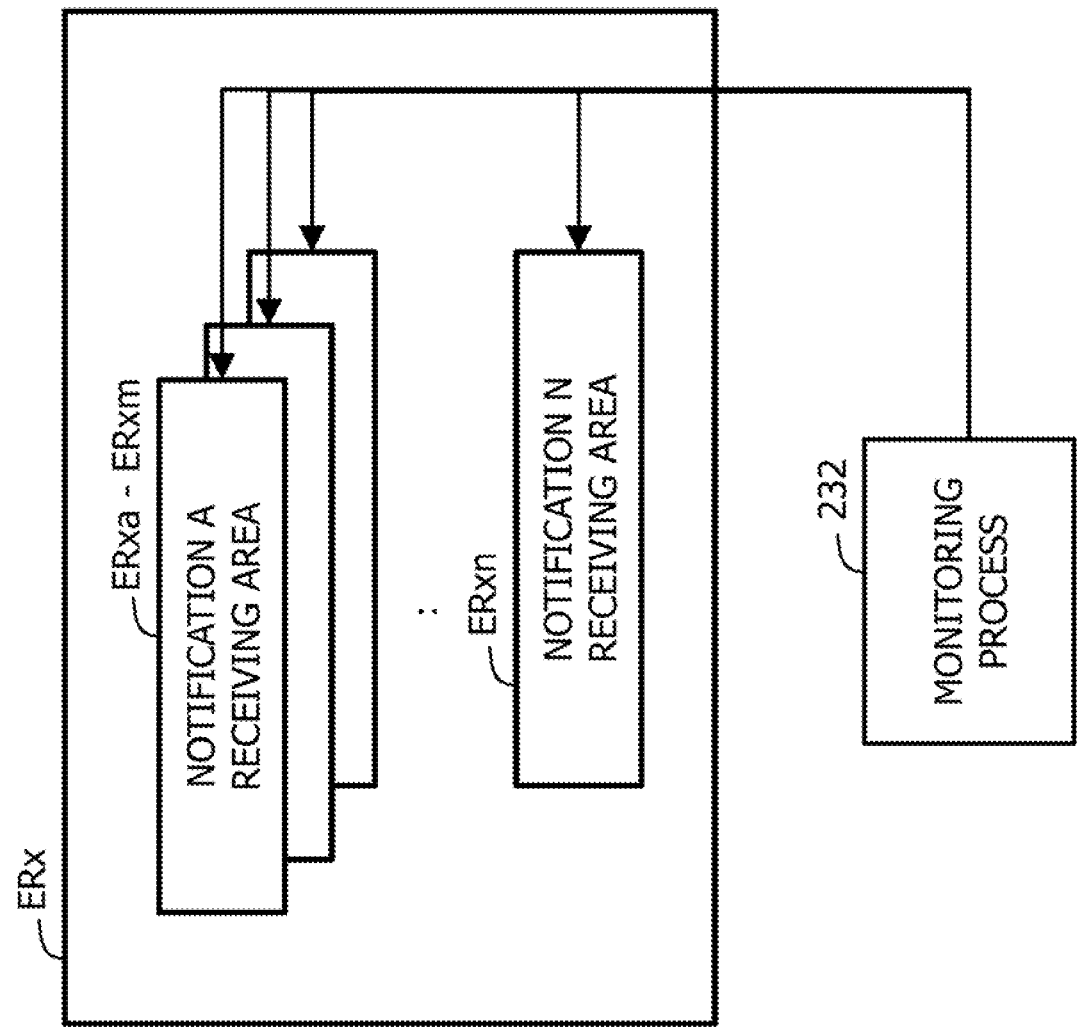
FIG. 2 is a diagram depicting the monitoring of many notification receiving areas ERxa to ERxn based on polling according to a comparative example.

FIG. 2 is a diagram depicting the monitoring of many notification receiving areas ERxa to ERxn based on polling according to a comparative example. FIG. 2 illustrates notification A receiving area ERxa to notification N receiving area ERxn (also called each notification receiving area ERx) as the monitoring targets. In other words, FIG. 2 illustrates a case of monitoring many notification receiving areas ERx.

A monitoring process 232 in FIG. 2 repeats processing to cyclically monitor each notification receiving area ERx. Hence in the case when one monitoring process 232 monitors many notification receiving areas ERx, a monitoring frequency of each notification receiving area ERx is the same.

Therefore if a notification receiving area ERx (e.g. notification A receiving area ERxa) is updated by the notification A immediately after monitoring the notification A receiving area ERxa, the monitoring process 232 detects the update of the notification A receiving area ERxa in the next cycle. In other words, the monitoring process 232 detects that the notification A receiving area ERxa has been updated by the notification A in the next cycle, after checking notification B receiving area ERxb to notification N receiving area ERxn.

When there are many notification receiving areas ERx like this, it may take a long time from the update of the notification A receiving area ERxa to the detection of the update by the monitoring process 232, depending on the notification update timing. As a result, it takes a long time from the update of the notification A receiving area ERxa to the execution of the response processing (hereafter called response time).

One solution of this problem is assigning priority to each of the notification receiving areas ERx, and changing the monitoring frequency of each notification receiving area ERx in accordance with the priority. For example, if the priority of the notification A receiving area ERxa is assigned to be high, the update of the notification A receiving area ERxa can be quickly detected.

Figure 3:
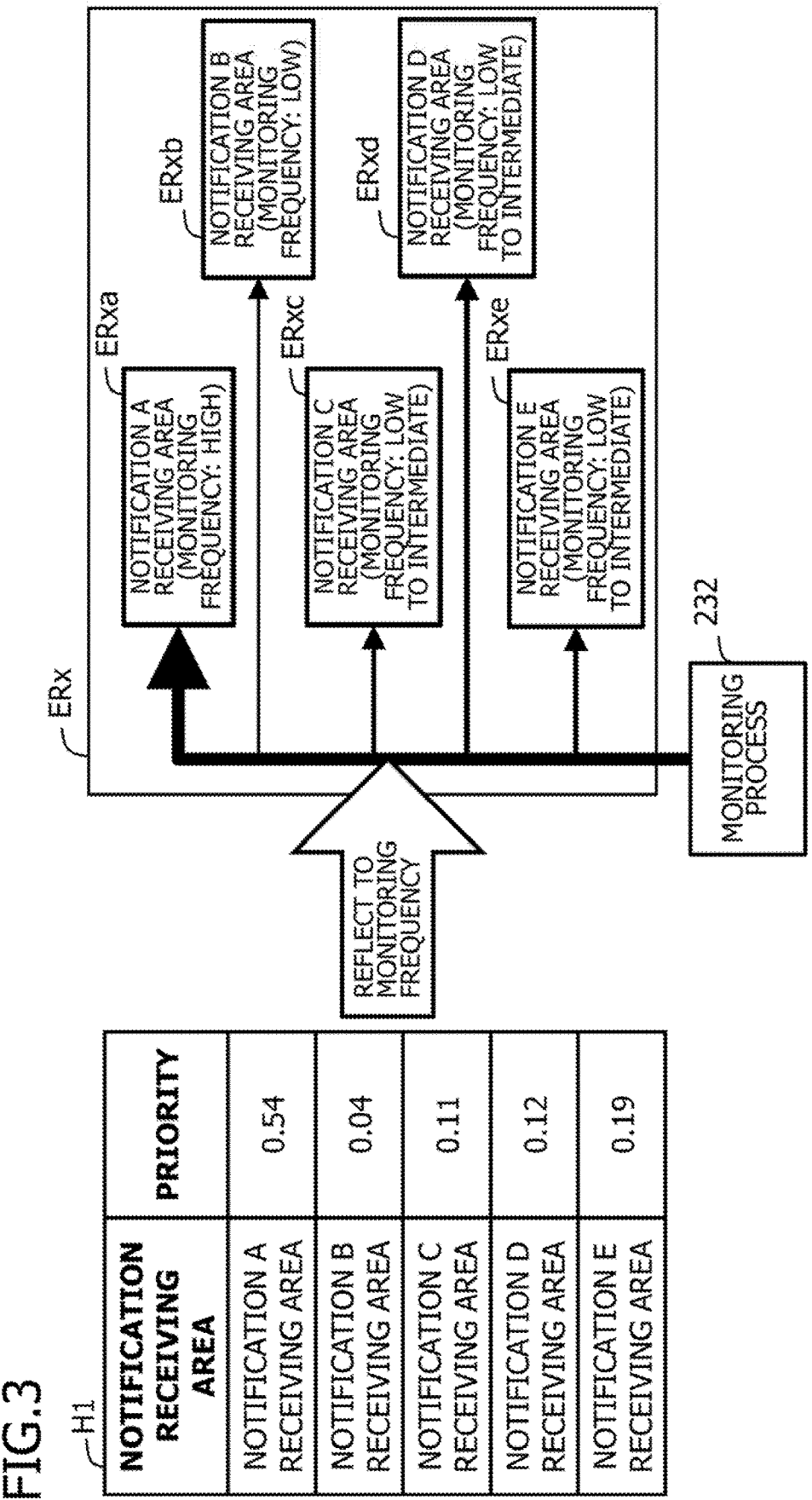
FIG. 3 is a diagram depicting the monitoring of a plurality of notification receiving areas ERx having different priorities in accordance with the comparative example.

FIG. 3 is a diagram depicting the monitoring of a plurality of notification receiving areas ERx having different priorities in accordance with the comparative example. FIG. 3 is a case when the monitoring targets are the notification A receiving area ERxa to the notification E receiving area ERxe (also called each notification receiving area ERx).

Table H1 in FIG. 3 indicates the priority information of each notification receiving area ERx. According to Table H1, the priority of the notification A receiving area ERxa is value "0.54", and the priority of the notification B receiving area ERxb is value "0.04". The priority of the notification C receiving area ERxc is value "0.11", the priority of the notification D receiving area ERxd is value "0.12", and the priority of the notification E receiving area ERxe is value "0.19".

Therefore according to Table H1, the priority of the notification A receiving area ERxa is the highest. The priorities of the notification C receiving area ERxc to the notification E receiving area ERxe are lower than the notification A receiving area ERxa and higher than the notification B receiving area ERxb. The priority of the notification B receiving area ERxb is the lowest.

According to the priorities indicated in Table H1, the monitoring process 232 is demanded to monitor the notification A receiving area ERxa, which has the highest priority, based on the monitoring frequency "high". In the same way, the monitoring process 232 is demanded to monitor the notification C receiving area ERxc to the notification E receiving area ERxe based on the monitoring frequency "low to intermediate", and the notification B receiving area ERxb based on the monitoring frequency "low".

However in the case of one monitoring process 232 monitoring a plurality of notification receiving areas ERx, polling is simplist since the plurality of notification receiving areas ERx is monitored sequentially. In this case, the monitoring frequency of each notification receiving area ERx is the same regardless the priority. Therefore in the case of one monitoring process 232 monitoring the plurality of notification receiving areas ERx, an improvement method to change the monitoring frequencies among the plurality of notification receiving areas ERx is needed.

For example, a method of changing the monitoring frequency of each notification receiving area ERx in accordance with the priority using a timer interrupt or time management is available. For example, the monitoring frequency of each notification receiving area ERx is changed based on the timer interrupt for each period in accordance with the priority. However using the timer interrupt or time management complicates the processing performed by the monitoring process 232.

Therefore when one monitoring process 232 monitors the plurality of notification receiving areas ERx based on polling, changing the monitoring frequency of each notification receiving area ERx is needed without using the timer interrupt or time management.

Outline of this Embodiment

The information processing apparatus 100 according to this embodiment includes a monitoring unit configured to poll and monitor a plurality of monitoring targets. The number of times of monitoring of the first monitoring target is greater than the number of times of monitoring of the second monitoring target.

By changing the number of times of monitoring depending on the monitoring target like this, the monitoring frequency of a monitoring target having a high priority can be increased. Thereby the information processing apparatus 100 can decrease the time from the change (update) of the monitoring target having high priority to the detection of this change by the monitoring unit 132, and can decrease the time from the generation of this change to the execution of the response processing (also called response time).

Figure 4:
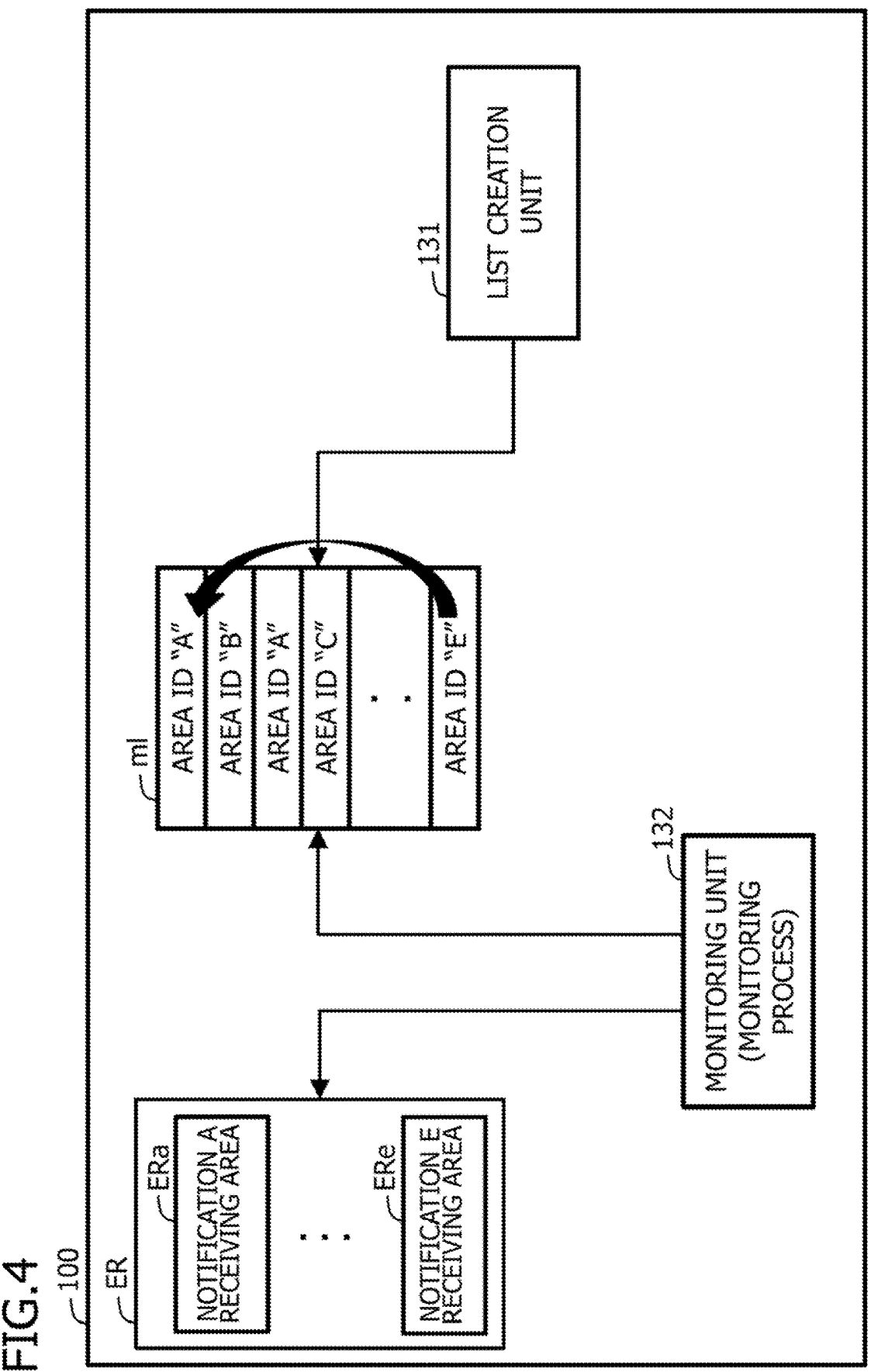
FIG. 4 is a diagram schematically depicting the processing of the information processing apparatus 100 according to this embodiment.

FIG. 4 is a diagram schematically depicting the processing of the information processing apparatus 100 according to this embodiment. In FIG. 4, a same composing element as in FIG. 1 is denoted with a same reference sign. FIG. 4 illustrates a notification A receiving area ERa to a notification E receiving area ERe, a monitoring list ml, and a list creation unit 131 configured to create the monitoring list ml.

The monitoring targets in the example of FIG. 4 are the notification A receiving area ERa to the notification E receiving area ERe (also called each notification receiving area ER). Therefore the monitoring list ml has a list of identification information to identify each notification receiving area ER (hereafter called area ID (identification)). Hereafter an area ID of the notification A receiving area ERa is called an area ID "A", and an area ID of the notification B receiving area ERb is called an area ID "B" The other notification receiving areas ER are also called by an area ID in the same manner.

The list creation unit 131 creates the monitoring list ml depicted in FIG. 4. The appearance frequency of each of area IDs "A" to "E" (also called each area ID) in the monitoring list ml in FIG. 4 is different depending on the area ID. According to the example in FIG. 4, the appearance frequency of the area ID "A" is the highest.

A monitoring unit (corresponding to the monitoring process) 132 depicted in FIG. 4 repeats the processing to cyclically monitor each notification receiving area ER according to the listing order in the monitoring list ml. If it is detected that a monitoring target has changed to a predetermined state while monitoring the plurality of monitoring targets (notification receiving areas ER) according to the listing order in the monitoring list ml, the monitoring unit 132 executes response processing corresponding to this monitoring target.

Thereby the monitoring unit 132 monitors a notification receiving area ER having a high appearance frequency in the monitoring list ml at a higher monitoring frequency. On the other hand, the monitoring unit 132 monitors a notification receiving area ER having a low appearance frequency in the monitoring list ml at a lower monitoring frequency. Thus the number of times of monitoring the first monitoring target by the monitoring unit 132 is greater than the number of times of monitoring of the second monitoring target. As a result, depending on the monitoring target, the information processing apparatus 100 can decrease the response time to the execution of the response processing in accordance with the change of the monitoring target.

Embodiment 1

Next a hardware configuration of the information processing apparatus 100 according to this embodiment will be described with reference to FIG. 6, and the software functions of the information processing apparatus 100 according to this embodiment will be described with reference to FIG. 7.

In Embodiment 1, a case when a monitoring target includes a predetermined area and a predetermined state includes a state where a predetermined area has been updated by a notification will be described. In other words, according to Embodiment 1, the monitoring target is the notification receiving area ER, and a monitoring unit 132 detects that the monitoring target has changed to the predetermined state when the monitoring unit 132 detects that the notification receiving area ER has been updated by a notification.

[Hardware Configuration of Information Processing Apparatus]

Figure 6:
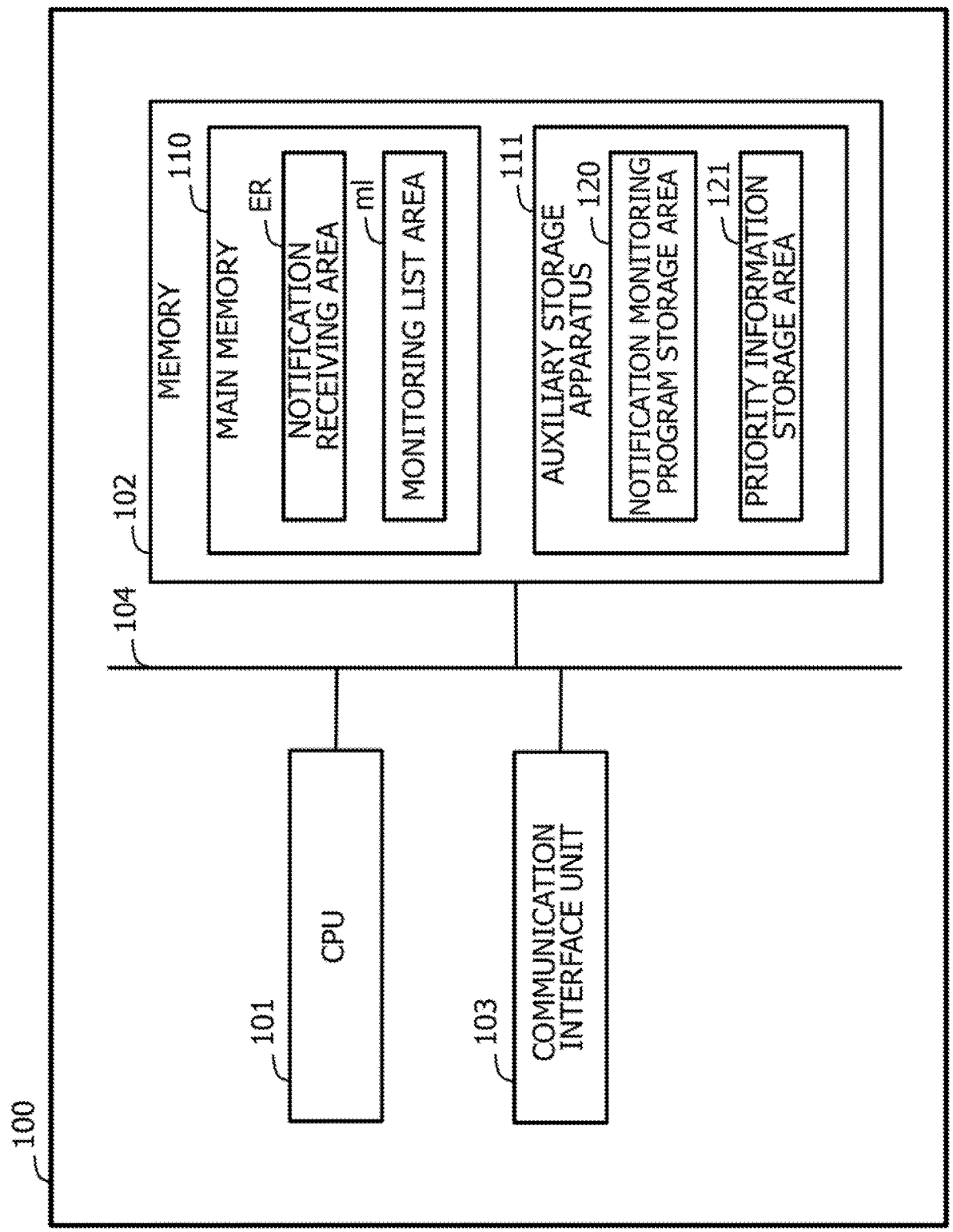
FIG. 6 is a hardware block diagram of the information processing apparatus 100 according to Embodiment 1.

FIG. 6 is a hardware block diagram of the information processing apparatus 100 according to Embodiment 1. The information processing apparatus 100 is constituted by, for example, a central processing unit (CPU) 101, a memory 102 including a main memory 110 and an auxiliary storage apparatus 111, and a communication interface unit 103. Each component is inter-connected via a bus 104.

The CPU 101 is connected with the memory 102 and the like via the bus 104, and generally controls the information processing apparatus 100. The communication interface unit 103 is connected with another apparatus and transmits/receives data. The main memory 110, such as random access memory (RAM), stores data that is processed by the CPU 101.

The main memory 110 includes each notification receiving area ER and a monitoring list area ml. The notification receiving area ER indicates a monitoring target, where a notification by another process or another apparatus is received. The monitoring list area ml (also called monitoring list ml) has a list of area IDs that indicates each notification receiving area ER (monitoring target).

The auxiliary storage apparatus 111 includes an area for storing programs of an operation system which the CPU 101 executes (not illustrated), a notification monitoring program storage area 120, and a priority information storage area 121. The auxiliary storage apparatus 111 is a hard disk drive (HDD), a non-volatile semiconductor memory or the like.

A notification monitoring program of the notification monitoring program storage area 120 (hereafter called notification monitoring program 120) is loaded in the main memory 110. By the CPU 101 executing the notification monitoring program 120 loaded in the main memory 110, the processing to create the monitoring list ml according to Embodiment 1 and the monitoring processing based on the monitoring list ml, are implemented.

Priority information in the priority information storage area 121 (hereafter called priority information 121) includes information on a priority corresponding to each notification receiving area ER. An example of the priority information 121 will be described later with reference to FIG. 9.

[Software Functions of Information Processing Apparatus]

Figure 7:
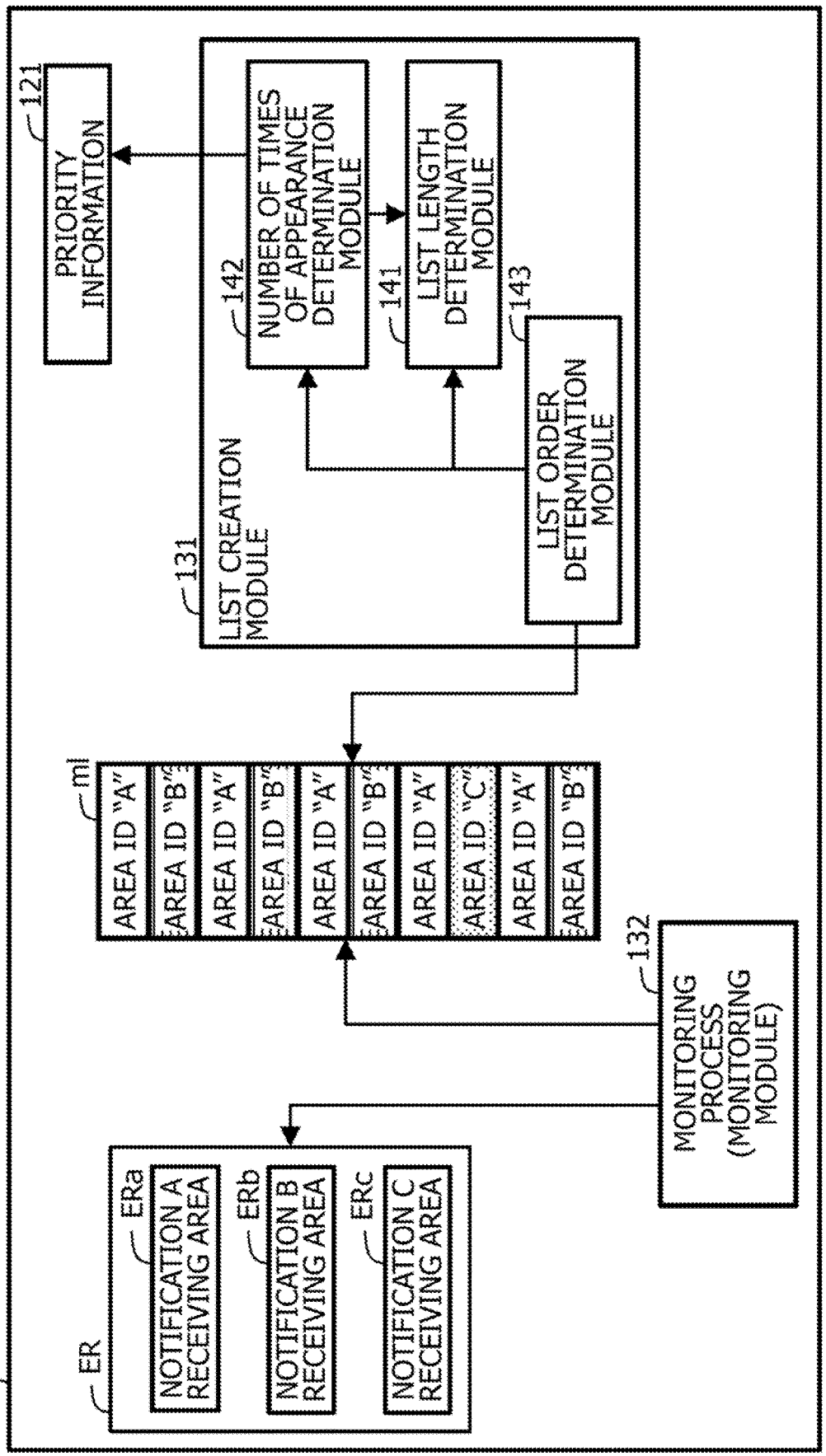
FIG. 7 is a diagram depicting the software functions of the information processing apparatus 100 depicted in FIG. 6.

FIG. 7 is a diagram depicting the software functions of the information processing apparatus 100 depicted in FIG. 6. In FIG. 7, a same composing element as FIG. 4 is denoted with a same reference sign. The notification monitoring program 120 depicted in FIG. 6 includes a list creation module (corresponding to the list creation unit in FIG. 4) 131, and a monitoring module (corresponding to the monitoring unit or monitoring process in FIG. 4) 132.

The list creation module 131 refers to the priority information 121, and creates the monitoring list ml in which the appearance frequency of each notification receiving area ER is different, depending on the priority assigned to the notification receiving area ER. The list creation module 131 includes a list length determination module 141, the number of times of appearance determination module 142, and a list order determination module 143. Details on the processing by the list creation module 131 will be described later with reference to the flow chart in FIG. 8.

The list length determination module 141 determines the list length of the monitoring list ml. The list length is a total number of listed area IDs in the monitoring list ml (that is, the number of entries in the monitoring list ml). The number of times of appearance determination module 142 determines the number of times of appearance of each notification receiving area ER in the monitoring list ml based on the priority information 121 of each notification receiving area ER and the list length determined by, the list length determination module 141. The list order determination module 143 determines the order of each notification receiving area ER in the monitoring list ml.

The monitoring module 132 polls and monitors each notification receiving area ER according to the listing order of the notification receiving areas ER in the monitoring list ml. Then responding to the detection of the change of a notification receiving area ER to a predetermined state, the monitoring module 132 executes the response processing corresponding to this notification receiving area ER. The response processing is as described above with reference to FIG. 1. Details on the processing by the monitoring module 132 will be described later with reference to the flow chart in FIG. 13.

Next details on the monitoring list ml according to this embodiment will be described with reference to FIG. 5.

(Monitoring List ml)

Figure 5:
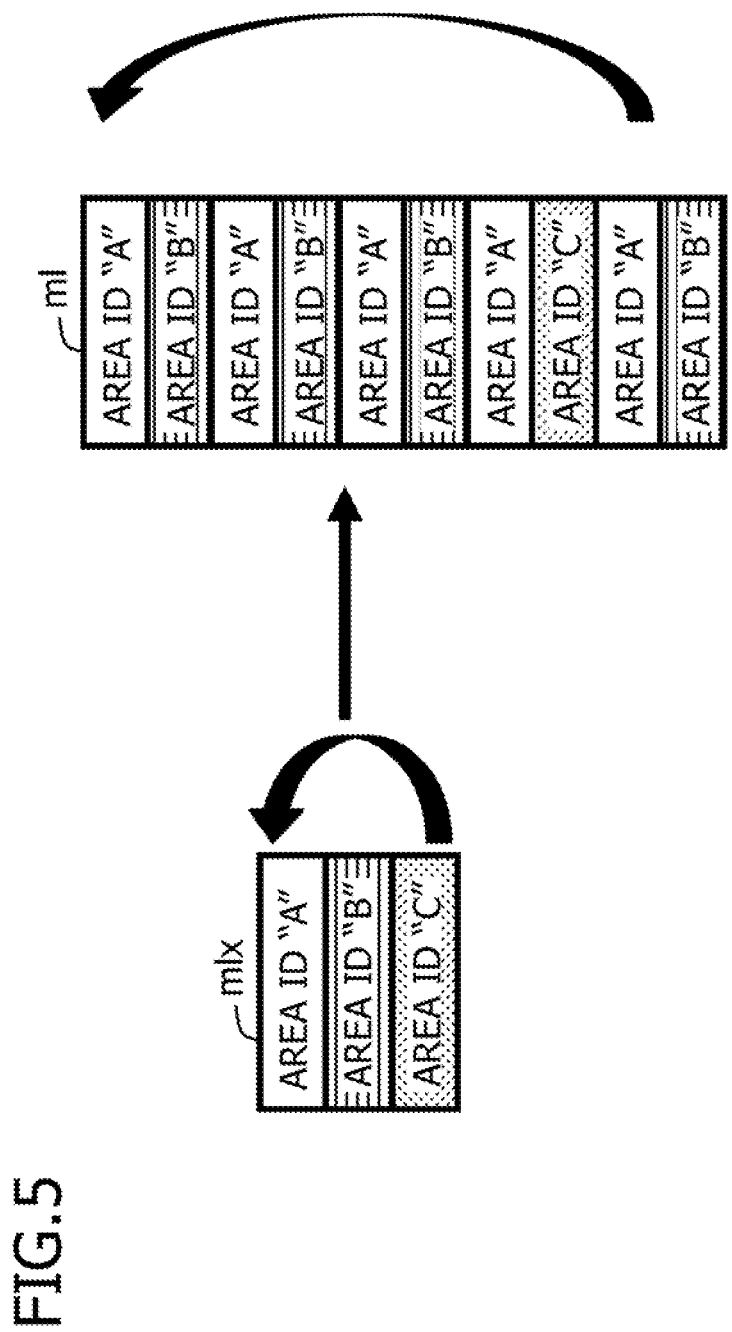
FIG. 5 is an example of the monitoring list mix according to the comparative example (FIG. 2, FIG. 3), and an example of the monitoring list ml according to this embodiment.

FIG. 5 is an example of the monitoring list mix according to the comparative example (FIG. 2, FIG. 3), and an example of the monitoring list ml according to this embodiment. The monitoring lists mix and ml depicted in FIG. 5 include a list of area IDs "A" to "C" to identify the notification A receiving area ERa to the notification C receiving area ERc.

The monitoring list mix according to the comparative example depicted in FIG. 2 and FIG. 3 has one entry of area ID "A", one entry of area ID "B" and one entry of area ID "C". Therefore the monitoring process 232 (FIG. 2, FIG. 3) according to the comparative example repeatedly monitors each notification receiving area ERx in the sequence of the notification A receiving area ERxa, the notification B receiving area ERxb, and the notification C receiving area ERxc. Thereby according to the monitoring list mix of the comparative example, the monitoring frequency of each notification receiving area ERx is frequency "1/3", and the monitoring frequency is equal for the notification A receiving area ERxa to the notification C receiving area ERxc.

In the case of the monitoring list ml according to this embodiment, on the other hand, has 10 entries of area Ids, and 5 entries out of 10 entries are the area ID "A", 4 entries indicated by horizontal lines are the area ID "B", and 1 entry indicated by halftones is the area ID "C". Therefore the order is the notification A receiving area ERa, the notification B receiving area ERb, the notification A receiving area ERa, the notification B receiving area ERb, the notification A receiving area ERa, the notification B receiving area ERb, the notification A receiving area ERa, the notification C receiving area ERc, the notification A receiving area ERa, and the notification B receiving area ERb.

In other words, according to the monitoring list ml in FIG. 5, the monitoring frequency of the notification A receiving area ERa is frequency "5/10". The monitoring frequency of the notification B receiving area ERb is frequency "4/10", and the monitoring frequency of the notification C receiving area ERc is frequency "1/10". In this way, according to the monitoring list ml in FIG. 5, the appearance frequency of each area ID is different, hence the monitoring frequency of each notification receiving area ER is different.

In this embodiment, the monitoring module 132 performs polling according to the listing order of the monitoring targets in the monitoring list ml. Further, the appearance frequencies of the first monitoring targets (e.g. notification A receiving area ERa and notification B receiving area ERb) have a 2 or higher appearance frequency in the monitoring list ml of this embodiment. By using a monitoring list ml in which a part of the monitoring targets have a 2 or higher appearance frequency, the monitoring frequency can be easily increased for the part of the monitoring targets.

As illustrated in FIG. 5, the appearance frequency of each monitoring target in the monitoring list ml is different. This means that the number of times of appearance of each monitoring target in the monitoring list ml is not equal. By cyclically monitoring each monitoring target according to the listing order in the monitoring list, the monitoring module 132 monitors each monitoring target at a monitoring frequency in accordance with the number of times of appearance. In other words, the monitoring module 132 can easily change the monitoring frequency of each monitoring target by polling each monitoring target, of which appearance frequency is not equal, according to the listing order in the monitoring list.

By focusing on the appearance frequency of each monitoring target in the monitoring list ml like this, a monitoring frequency that is not equal for each monitoring target can be implemented in the monitoring based on polling in which generally the monitoring frequency of each monitoring target is equal. Therefore when one process (corresponding to the monitoring module 132) performs monitoring based on polling, the information processing apparatus 100 can easily increase the monitoring frequency of a part of the monitoring targets.

The information processing apparatus 100 according to this embodiment also includes the list creation module 131 configured to create a monitoring list in accordance with the monitoring targets. When the priority of a third monitoring target is higher than the priority of a second monitoring target, the list creation module 131 makes the appearance frequency of the third monitoring target higher than the appearance frequency of the second monitoring target in the monitoring list ml.

By creating the monitoring list in which the appearance frequency is higher for a monitoring target having high priority, the monitoring frequency of the monitoring target having high priority can be increased. Thereby the information processing apparatus 100 can decrease the time from the change (update) of the monitoring target having high priority to the detection of this change by the monitoring unit 132, and can decrease the time from this change to the execution of the response processing (also called response time).

According to the example in FIG. 5, the appearance frequency of notification A receiving area ERa, which has high priority, is high in the monitoring list ml. Therefore the monitoring module 132 monitors the notification A receiving area ERa more frequently. Thereby even if there are many notification receiving areas ER, the monitoring module 132 can detect the update of the notification receiving area A quickly, and decrease the response time for the notification A receiving area ERa.

In this way, the information processing apparatus 100 according to this embodiment polls each monitoring target having a different appearance frequency according to the listing order in the monitoring list ml, whereby the response time until the execution of the response processing, corresponding to the change of the monitoring target, can be decreased for each monitoring target using a simple method.

The processing flow of the notification monitoring program 120 depicted in FIG. 6 and FIG. 7 will be described with reference to FIG. 8 to FIG. 10.

[Processing Flow of List Creation Module 131]

Figure 8:
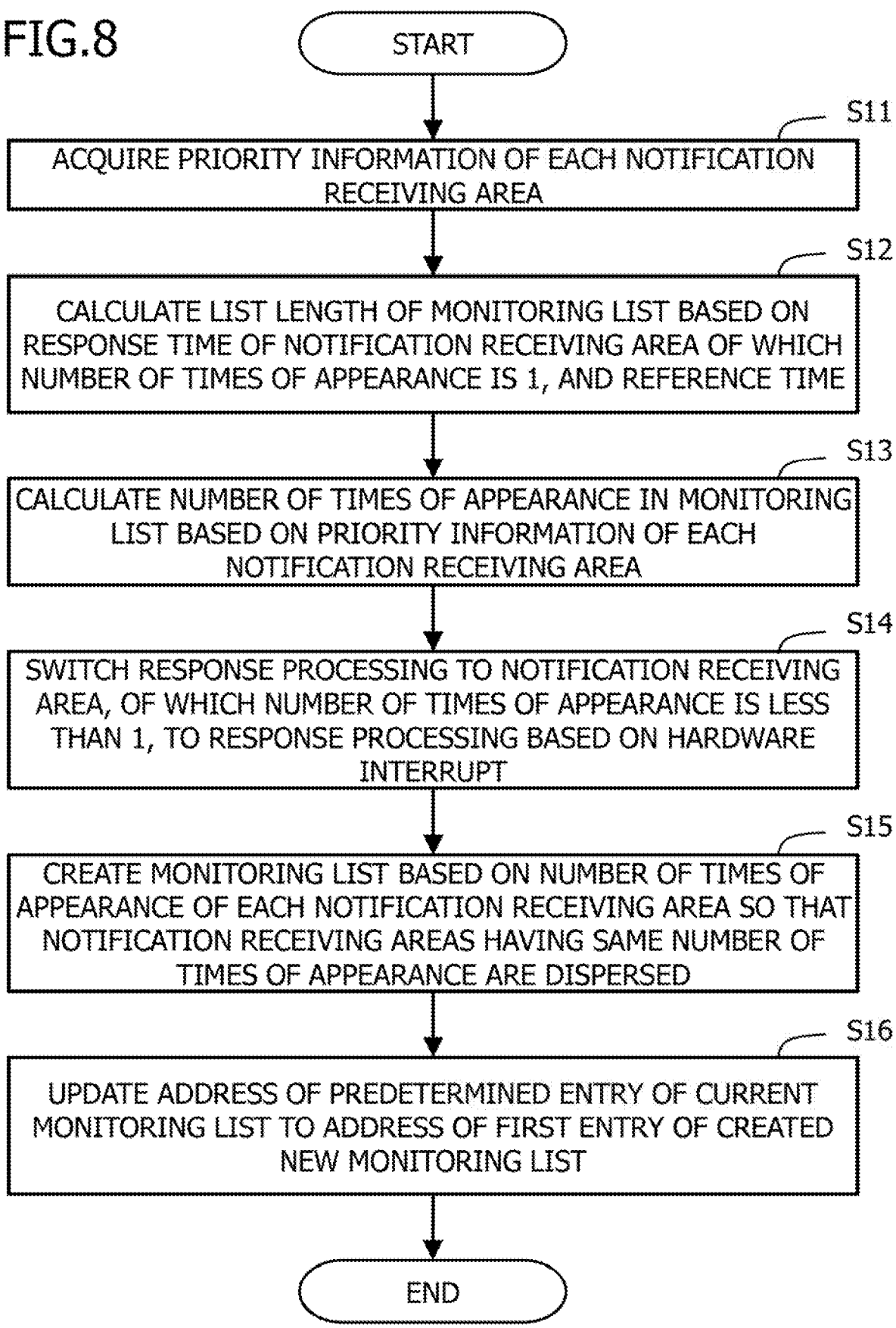
FIG. 8 is a flow chart depicting a processing flow of the list creation module 131 of the notification monitoring program 120 illustrated in FIG. 7.

FIG. 8 is a flow chart depicting a processing flow of the list creation module 131 of the notification monitoring program 120 illustrated in FIG. 7. The list creation module 131 executes the processing in the flow chart in FIG. 8 when the priority information 121 (FIG. 6, FIG. 7) is updated, for example.

S11: The number of times of appearance determination module 142 acquires the priority information 121 of each notification receiving area ER, and instructs the list length determination module 141 to perform the list length determination processing. The priority information 121 is inputted in advance by a system administrator, a user or the like.

The system administrator or the user generates the priority information 121 of each notification receiving area ER based on, for example, an update probability, which indicates the probability of being updated next, in each notification receiving area ER, the urgency of response and the like, and inputs the generated priority information 121. For example, a high priority is assigned when the update probability is high, or when the urgency of response is high.

The information processing apparatus 100 may create the priority information 121. For example, an operation program for performing computing processing, which is operated by the information processing apparatus 100, periodically estimates the update probability of each notification receiving area ER, and updates the priority information 121 based on the update probability. The operation program assigns a high priority to a notification receiving area ER of which update probability is high.

Thereby the monitoring module 132 can quickly detect the update of the notification receiving area ER which has a high update probability. The number of times of appearance determination module 142 executes the processing in the flow chart in FIG. 8 every time the program updates the priority information 121.

For example, in the case of executing an operation program which can estimate behavior at high probability, it is effective to update the priority information 121. If the priority information 121 is updated and the monitoring list ml, which is recreated in accordance with the update, is used, the operation program can further decrease the response time for the monitoring target. As a result, the operation program can implement high-speed processing.

S12: The list length determination module 141 calculates the list length of the monitoring list ml (the number of entries in the monitoring list ml) based on the response time for the notification receiving area ER, of which the number of times of appearance in the monitoring list ml is 1, and the reference time.

If the list length of the monitoring list ml is long, the time for the monitoring module 132 to make one cycle of monitoring the monitory targets in the monitoring list ml becomes long. The time from the update of a notification receiving area ER to the detection of this update varies depending on the update timing. Therefore if the list length is long, the time difference between the shortest time and the longest time, until the detection of the update of a notification receiving area ER of which the number of times of appearance is 1, increases, and the variation range of the response time increases.

Therefore the list length determination module 141 calculates a total number of monitoring targets in the list (list length) so that the response time for a monitoring target, of which the number of times of appearance in the monitoring list ml is 1, is shorter than a predetermined reference time. The response time for a monitoring target, of which the number of times of appearance is 1, is the total of a first time that is the time from the change of this monitoring target to the detection of this change, and a second time that is the time from the detection of this change to the start of the response processing.

Thereby the list length determination module 141 can calculate the list length of the monitoring list ml, by which a response time for a notification receiving area ER, of which the number of times of appearance is 1, does not exceed the predetermined reference time. As mentioned above, the first time depends on the list length. Hence in Embodiment 1, the first time is assumed to be, for example, the average or the longest time of the time from the change of the monitoring target to the predetermined state to the detection of this change. The first time according to this embodiment corresponds to an average or the longest time which the monitoring module 132 would take to execute a cycle of monitoring all the monitoring targets in the monitoring list ml.

In this embodiment, the predetermined reference time is the time from the generation of a hardware interrupt in response to the processing to change a monitoring target to a predetermined state (update processing) to the execution of the response processing (hardware interrupt response time). By setting the predetermined reference time to the hardware interrupt response time, the list length determination module 141 can determine a list length, by which the response time for a notification receiving area ER, of which the number of times of appearance is 1, becomes shorter than the hardware interrupt response time.

In other words, if the length of the monitoring list is without limit, the hardware interrupt response time becomes shorter than the response time when monitoring is based on polling, that is, when executing the response processing according to this embodiment. Therefore as mentioned above, it is preferable to set the upper limit of the list length of the monitoring list ml based on the first time (average of longest) from the change of the monitoring target to the predetermined state to the detection of this change.

(Details on Step S12)

Here details on the processing in step S12 will be described. As mentioned above, the list length determination module 141 calculates the list length "N") based on the response time for a notification receiving area ER, of which the number of times of appearance is 1, and the hardware interrupt response time.

As mentioned above, the response time for a notification receiving area ER, of which the number of times of appearance is 1, is the total of the average or longest time from the update of this notification receiving area ER to the detection of this update (value "$T_{pA}$") and the time from the detection of the update to the start of the response processing ("$T_{pB}$").

$$T_{pA} = \alpha \times (N+1)/2 \qquad \text{Expression 1}$$

$$T_{pA} = \alpha \times N \qquad \text{Expression 2}$$

The value "$\alpha$" in Expression 1 and Expression 2 denotes the time that is needed for monitoring a notification receiving area ER of one entry in the monitoring list ml having the list length "N". Therefore the value "$T_{pA}$" in Expression 1 indicates the average time of the time that is needed to execute one cycle of the monitoring list ml, and the value "$T_{pA}$" in Expression 2 indicates the time that is needed to execute one cycle of the monitoring list ml. In this embodiment, a case of calculating the value "$T_{pA}$" based on Expression 1 (averaging) is described.

$$Ti > T_{pA} + T_{pB} \qquad \text{Expression 3}$$

The list length determination module 141 calculates the list length "N" based on Expression 3. The value "$T_{pA}+T_{pB}$" in Expression 3 indicates the response time for the notification receiving area ER of which the number of times of appearance is 1, as mentioned above. The value "$T_{pB}$" indicates the average time from the detection of an update to the start of the response processing. The value "Ti" indicates the hardware interrupt response time, and is the average response time that is needed to execute the response processing responding to the generation of the notification to change a notification receiving area ER to a predetermined state.

In other words, the list length determination module 141 calculates, based on Expression 3, the list length "N" by which the response time "$T_{pA}+T_{pB}$" for a notification receiving area ER, of which the number of times of appearance is 1, become shorter than the hardware interrupt response time "Ti".

$$2(Ti - T_{pB})/\alpha - 1 > N \qquad \text{Expression 4}$$

Expression 3 can be converted into Expression 4 based on Expression 1. Hence the list length determination module 141 calculates the maximum value of "N" that satisfies Expression 4 as the list length. For example, it is assumed that the value "$\alpha$=50 ns" (nanoseconds), the value "$T_{pB}$=150 ns", and the value "Ti=3000 ns". Then the list length determination module 141 calculates "2*(3080−150)/50−1>N" based on Expression 4, and determines the value "N=113" as the list length.

Description of the flow chart in FIG. 8 resumes.

S13: Based on the priority information 121 of each notification receiving area ER, the number of times of appearance determination module 142 calculates the number of times of appearance of each notification receiving area ER in the monitoring list ml. In other words, the number of times of appearance determination module 142 calculates the number of times of appearance of each monitoring target by allocating the total number of monitoring targets in the list ("N") included in the monitoring list ml based on the ratio of priority of each of the plurality of monitoring targets. Details on the processing of the step S13 will be described later with reference to FIG. 9.

In other words, based on the mutual relationship of the priorities among the plurality of notification receiving areas ER and the list lengths, the number of times of appearance determination module 142 calculates the number of times of appearance of each notification receiving area ER. Thereby the number of times of appearance determination module 142 can appropriately calculate the number of times of monitoring of each notification receiving area ER in the monitoring list ml in accordance with the priority.

The number of times of appearance determination module 142 also creates the monitoring list ml, so that the appearance frequency of the first monitoring target is higher than the appearance frequency of the second monitoring target, of which priority is lower than the first monitoring target. In other words, the number of times of appearance determination module 142 increases the monitoring frequency of the first monitoring target having a high priority by increasing the appearance frequency of the first monitoring target Thereby the monitoring module 132 can quickly detect that the first monitoring target has changed to a predetermined state.

S14: The number of times of appearance determination module 142 switches the response processing to a notification receiving area ER, of which the number of times of appearance calculated in step S13 is less than 1, to the response processing based on a hardware interrupt which is generated in response to the update by notification.

In some cases, the first length of the monitoring list ml becomes longer than the list length determined in step S12, if a monitoring target, of which the number of times of appearance is less than 1, is included in the monitoring list ml in step S13. As mentioned above, if the list length of the monitoring list ml is long, it takes time to execute one cycle of monitoring the monitoring targets in the monitoring list ml. This may generate a case when the response time for a monitoring target, of which the number of times of appearance is 1, becomes less than the reference time.

Therefore the number of times of appearance determination module 142 includes a monitoring target of which the calculated number of times of appearance is 1 or more in the monitoring list ml, and does not include a monitoring target of which the calculated number of times of appearance is less than 1 in the monitoring list ml. Thereby the number of times of appearance determination module 142 can create the monitoring list ml, in which the response to a monitoring target of which the number of times of appearance is 1, does not exceed the reference time.

The number of times of appearance determination module 142 according to this embodiment switches the monitoring control of a notification receiving area ER, of which the calculated number of times of appearance is less than 1, to the method for generating a hardware interrupt in response to the update processing of this notification receiving area ER. The number of times of appearance determination module 142 registers instruction information, which instructs, for example, to generate a hardware interrupt in response to the processing to change the state of a monitoring target, of which the calculated number of times of appearance is less than 1, to a predetermined state.

To execute the response processing to a monitoring target, which is not included in the monitoring list ml, based on the hardware interrupt, the number of times of appearance determination module 142 registers the instruction information in a register or the like, according to a hardware control command, for example. The instruction information is information to indicate whether an interrupt handler to execute the response processing is called up or not when a notification is generated. Thereby in the case of a registered update, the interrupt handler is started and the response processing is executed when this update is generated. In the case of an unregistered update, the interrupt handler is not started up even if this update is generated.

Thereby the number of times of appearance determination module 142 can implement the response processing to a notification receiving area ER of a monitoring target of which the number of times of appearance is less than 1, based on the hardware interrupt which can decrease the response time compared with the case of monitoring based on polling.

The number of times of appearance determination module 142 may notify a monitoring target, of which the calculated number of times of appearance is less than 1, to the system administrator or the user via the user interface of the information processing apparatus 100, and have the system administrator or the user determine whether this monitoring target is included in the monitoring list ml. The number of times of appearance determination module 142 may include the monitoring target in the monitoring list ml if the number of monitoring targets, of which the number of times of appearance is less than 1, is a predetermined number or less.

S15: The list order determination module 143 creates the monitoring list ml based on the number of times of appearance of each notification receiving area ER, so that the same notification receiving areas ER are dispersed in the monitoring list ml. In other words, the list order determination module 143 disposes each area ID in the monitoring list ml, so that the same notification receiving areas ER are dispersed in the monitoring list ml. Details on the processing in the step S15 will be described later with reference to the flow chart in FIG. 10.

By the above processing, the list order determination module 143 can disperse the monitoring timings of each notification receiving area ER. Therefore the list order determination module 143 can further decrease the time from the new update of the notification receiving area ER to the detection of this update by the monitoring module 132.

S16: The list order determination module 143 updates an address of a predetermined entry in the current monitoring list ml to an address of the first entry of the created new monitoring list ml. In other words, the list order determination module 143 updates the monitoring list ml, to which the monitoring module 132 refers to, from the current monitoring list ml to the new monitoring list ml. Thereby after monitoring the notification receiving area ER indicated by the predetermined entry, the monitoring module 132 monitors the notification receiving areas ER in accordance with the new monitoring list ml.

(Step S13 in FIG. 8)

FIG. 9 is a table describing the outline of the processing of step S13 in FIG. 8. As mentioned in FIG. 8, in step S13, the number of times of appearance determination module 142 calculates the number of times of appearance of each notification receiving area ER in the monitoring list ml based on the priority information 121 of each notification receiving area ER.

Table H2 in FIG. 9 includes the priority coefficient of each notification receiving area ER, and information corresponding to the number of times of appearance of each notification receiving area ER based on the priority coefficient. The priority coefficient of each notification receiving area ER is a value that corresponds to the priority information 121, and has been normalized so that the total value of the plurality of notification receiving area ER is value "1".

According to the example in FIG. 9, the priority coefficient of the notification A receiving area ERa is "0.43" the priority coefficient of the notification B receiving area ERb is "0.01", and the priority coefficient of the notification E receiving area ERe is "0.03".

Number of times of appearance=(priority coefficient/ total of priority coefficients of all notification receiving areas)*list length     Expression 5

The number of times of appearance determination module 142 calculates the number of times of appearance for each notification receiving area ER according to the above Expression 5, for example. The list length of the example in FIG. 9 is the value "113" in step S12, for example. Thereby the number of times of appearance determination module 142 calculates the number of times of appearance "34.4" of the notification A receiving area ERa based on the expression "(0.43/1)*113".

Therefore the number of times of appearance determination module 142 sets the area ID "A", which indicates the notification A receiving area ERa, for 34 entries out of a total of 113 entries of the monitoring list ml, for example. In the example in FIG. 9, the number of times of appearance is rounded to an integer, but the present invention is not limited to this example. It is only necessary that the total of the number of times of appearance of each of the plurality of notification receiving areas ER does not exceed the list length.

In the same manner, the number of times of appearance determination module 142 calculates the number of times of appearance "0.8" of the notification B receiving area ERb based on the expression "(0.01/1)*113". The number of times of appearance of the notification B receiving area ERb is less than "1". Hence the number of times of appearance determination module 142 does not include the area ID "B" in the monitoring list ml. Thereby the number of times of appearance determination module 142 maintains the list length of the monitoring list ml to a length limit or less.

In the example in FIG. 9, the number of times of appearance determination module 142 switches the response processing to the notification B receiving area ERb to the response processing by a hardware interrupt (S14 in FIG. 8). Thereby the number of times of appearance determination module 142 can implement the response processing to the notification B receiving area ERb by a hardware interrupt, of which response time is shorter than the monitoring based on polling.

In the same manner, the number of times of appearance determination module 142 calculates the number of times of appearance "2.4" of the notification E receiving area ERe based on the expression "(0.03/1)*113". The number of times of appearance determination module 142 sets the area ID "E" which indicates the notification E receiving area ERe, for 2 entries out of 113 entries of the monitoring list ml, for example.

In this way, the number of times of appearance determination module 142 distributes the entries of the monitoring list ml in accordance with the ratio of the priorities of the area IDs "A" to "E", and calculates each number of times of appearances of the area IDs W to "E". Thereby the number of times of appearance determination module 142 can appropriately calculate the number of times of appearance in accordance with the priority of each notification receiving area ER.

In the example in FIG. 9, the number of times of the appearance determination module 142 does not include a monitoring target, of which the number of times of appearance is less than 1, in the monitoring list ml. However, the appearance determination module 142 may include a monitoring target, of which the number of times of appearance is less than 1, in the monitoring list ml within a range of not exceeding the longest list length calculated by the list length determination module 141.

(Step S15 in FIG. 8)

Figure 10:
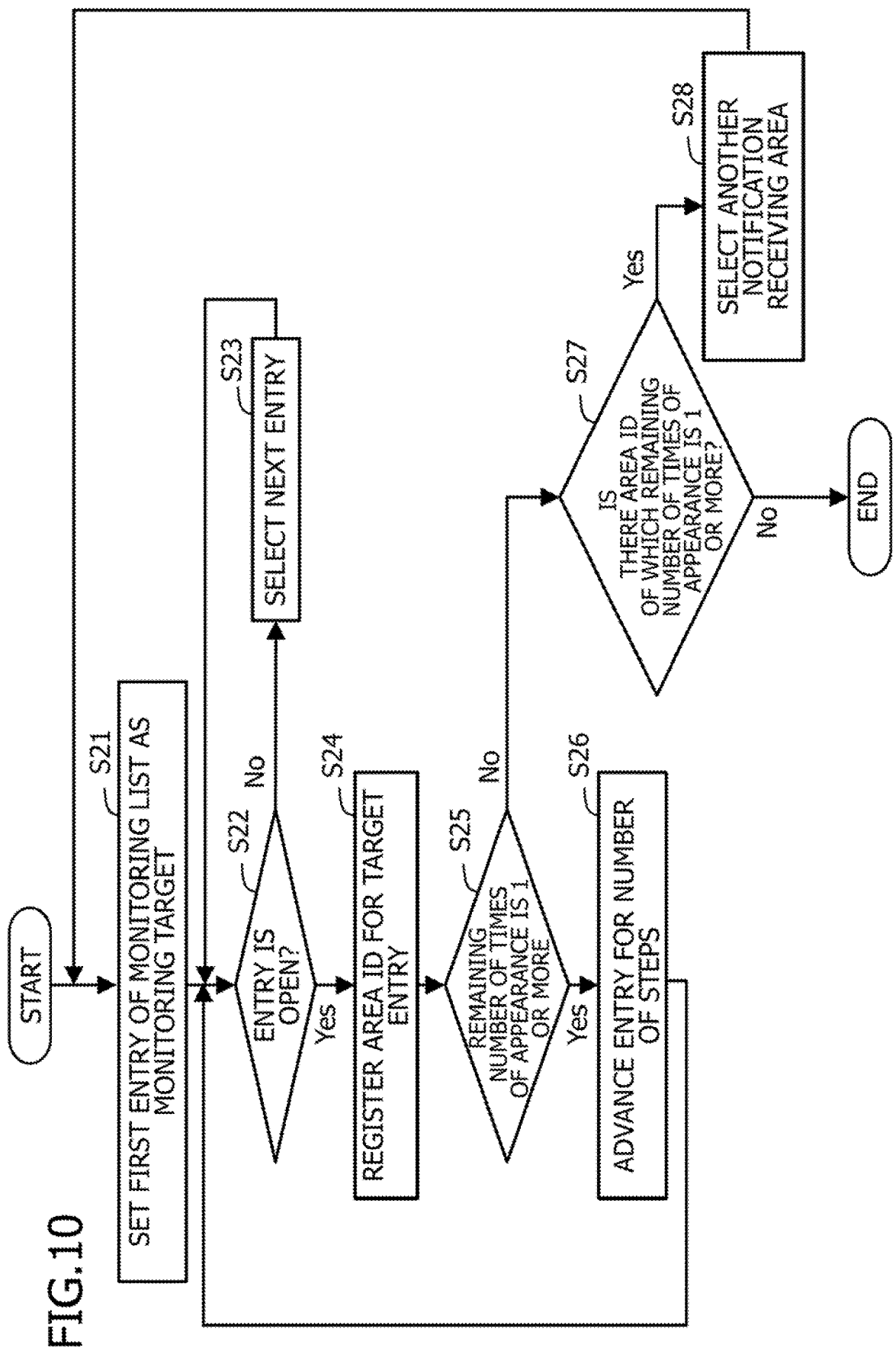
FIG. 10 is a flow chart depicting the details of the processing in step S15 in FIG. 8.

FIG. 10 is a flow chart depicting the details of the processing in step S15 in FIG. 8. As the processing in step S15, the list order determination module 143 creates the monitoring list ml based on the number of times of appearance of each notification receiving area ER, so that the same notification receiving areas ER are dispersed in the monitoring list ml, as mentioned in FIG. 8.

S21: The list order determination module 143 selects the first entry of the monitoring list ml as the target entry.

S22: The list order determination module 143 determines whether the selected target entry is open. In other words, the list order determination module 143 determines whether or not the notification receiving area ER is registered for the selected target entry.

S23: If the target entry is not open (NO in step S22), the list order determination module 143 selects the next entry, and processing advances to step S22.

S24: If the target entry is open (YES in step S22), the list order determination module 143 registers, for the target entry, a notification receiving area ER, of which remaining number of times of appearance is the highest.

S25: If the area ID is registered in the entry, the list order determination module 143 decrements the remaining number of times of appearance of the registered notification receiving area ER. Then the list order determination module 143 determines whether the remaining number of times of appearance after decrementing is the value "1" or more.

S26: If the remaining number of times of appearances is the value "1" or more (YES in step S25), the list order determination module 143 advances the entry by the number of steps corresponding to the number of times of appearance of the registered notification receiving area ER. Then the list order determination module 143 advances to step S22, and determines whether the target entry is open.

S27: If the remaining number of times of appearance is less than the value "1" (NO in step S25), the list order determination module 143 determines whether there is another notification receiving area ER of which the number of times of appearance is the value "1" or more. If there is not another notification receiving area ER (NO in step S27), the list order determination module 143 ends the processing in the flow chart in FIG. 10.

S28: If there is another notification receiving area ER (YES in step S27), on the other hand, the list order determination module 143 selects another notification receiving area ER, and advances to step S21.

In the same manner, the list order determination module 143 repeats the steps S21 to S27 for another notification receiving area ER that is selected. When the remaining number of times of appearance becomes less than the value '1' for all of the notification receiving areas ER (NO in step S27), the list order determination module 143 ends the processing in the flow chart in FIG. 10.

Next, examples of the processing of the notification monitoring program 120 according to this embodiment will be described with reference to FIG. 11 and FIG. 12.

Example

FIG. 11 is a first drawing for explaining an example of the processing by the notification monitoring program 120 according to Embodiment 1.

Table H3 in FIG. 11 includes the priority coefficients, the number of times of appearance, and the number of steps for the notification A receiving area ERa to the notification C receiving area ERc. As mentioned above, the priority coefficient corresponds to the priority information 121.

The number of times of appearance determination module 142 acquires the priority information 121 of each notification receiving area ER (S11 in FIG. 8) depicted in FIG. 11. Then the list length determination module 141 calculates the list length of the monitoring list ml. In the case of the example in FIG. 11, the list length determination module 141 calculates the list length "10", for example (S12).

Then the number of times of appearance determination module 142 distributes the list length "10" based on the ratio of priorities of the notification A receiving area ERa to the notification C receiving area ERc indicated in FIG. 11, and calculates the number of times of appearance of each notification receiving area ER (S13). In the case of Table H3, the priority coefficient of the notification A receiving area ERa is "0.5", the priority coefficient of the notification B receiving area ERb is "0.4", and the priority coefficient of the notification C receiving area ERc is "0.1".

Therefore the number of times of appearance determination module 142 calculates the number of times of appearance "5(=0.5/1)*10)" of the notification A receiving area ERa based on Expression 5. In the same manner, the number of times of appearance determination module 142 calculates the number of times of appearance "4" of the notification B receiving area ERb, and the number of times of appearance "1" of the notification C receiving area ERc, as indicated in Table H3.

According to the example in FIG. 11, there is no notification receiving area ER of which number of times of appearance is less than 1 (S14). Therefore the number of times of appearance determination module 142 includes the notification A receiving area ERa to the notification C receiving area ERc in the monitoring list ml. If the priority coefficient of the notification C receiving area ERc is value "0.05", for example, the number of times of appearance of the notification C receiving area ERc is less than 1. In this case, the number of times of appearance determination module 142 does not includes the notification C receiving area ERc in the monitoring list ml.

Then the list order determination module 143 creates the monitoring list ml based on the number of times of appearance of each notification receiving area ER, so that the same notification receiving areas ER are dispersed in the monitoring list ml (S15). The list order determination module 143 calculates the number of steps for each notification receiving area ER using the following Expression 6.

Number of steps=list length/number of times of appearance     Expression 6

Therefore the list order determination module 143 calculates the number of steps "2(=10/5)" for the notification A receiving area ERa as indicated in FIG. 11. In the same manner, the list order determination module 143 calculates the number of steps "3(≅10/4)" for the notification B receiving area ERb, and the number of steps "10(=10/1)" for the notification C receiving area ERc.

Figure 12:
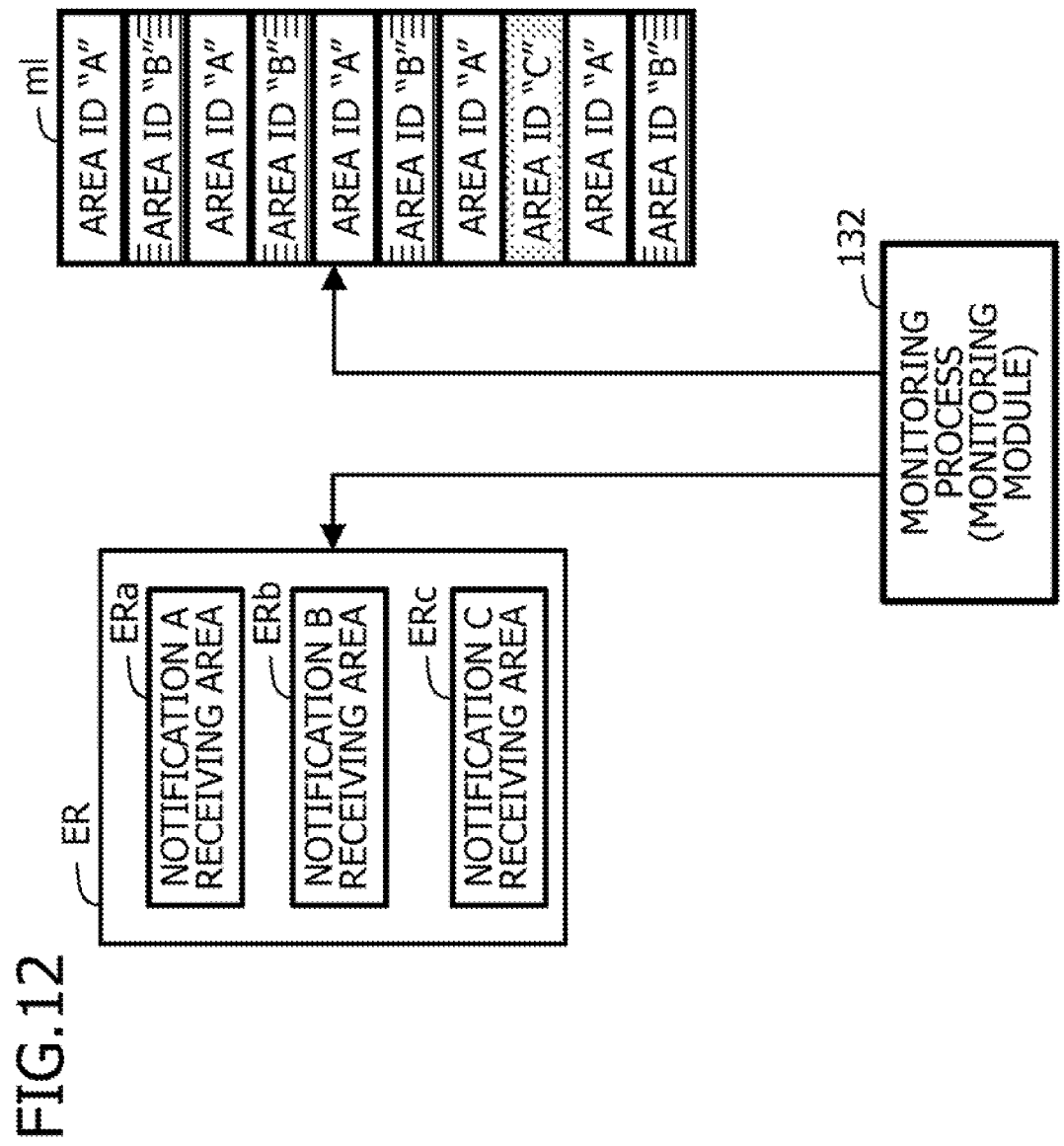
FIG. 12 is a second drawing for explaining an example of the processing by the notification monitoring program 120 according to Embodiment 1.

FIG. 12 is a second drawing for explaining an example of the processing by the notification monitoring program 120 according to Embodiment 1. FIG. 12 is a diagram depicting the notification A receiving area ERa to the notification C receiving area ERc, the monitoring list ml, and the monitoring module 132.

The list order determination module 143 determines whether the first entry of the monitoring list ml is open (S21 and S22 in FIG. 10). Since the target entry is open (YES in S22), the list order determination module 143 registers the area ID "A", indicating the notification A receiving area ERa of which the remaining number of times of appearance is highest, in the first entry (S24).

Since the remaining number of times of appearance of the entry of the notification A receiving area ERa is "4" (YES in S25), the list order determination module 143 increments the entry by "2", which is the number of steps of the notification A receiving area ERa, and selects the third entry as the target entry (S26).

Since the third entry is open (YES in S22), the list order determination module 143 registers the area ID "A" in the third entry (S24), and selects the fifth entry as the next target entry (YES in S25, S26). The list order creation module registers the area ID "A" in the fifth entry, which is open (YES in S22, S24). In the same manner, the list order creation module registers the area ID "A" in the seventh and ninth entries.

If the remaining number of times of appearance of the notification A receiving area ERa becomes less than the value "1" (NO in S25), the list order determination module 143 selects the notification B receiving area ERb as a target entry (YES in S27, S28). Since the first entry is not open, the list order determination module 143 registers the area ID "B" in the second entry (S21 to S24). The list order determination module 143 increments the entry by "3", which is the number of steps of the notification B receiving area ERb, and selects the fifth entry as the target entry (S26).

However, the area ID "A" has already been registered in the fifth entry, hence the list order determination module 143 registers the area ID "B" in the sixth entry (S22 to S24). In the same manner, the list order determination module 143 registers the area ID "B" in the tenth and fourth entries (S22 to S26).

Then the list order determination module 143 selects the notification C receiving area ERc, and registers the area ID "C" in the eighth entry, which is open (S22 to S26). Since the remaining number of times of appearance becomes less than "1" for all the notification receiving areas ER (NO in S27), the list order determination module 143 ends the processing.

In this way, the list order determination module 143 creates the monitoring list ml in which the same notification receiving areas ER are dispersed. According to the monitoring list ml in FIG. 12, the 5 entries of the area ID "A" and the 4 entries of the area ID "B" are not continuous. Therefore in the case of monitoring the monitoring targets based on the monitoring list ml in FIG. 12, the monitoring module 132 can disperse the monitoring timings of the notification A receiving area ERa and the notification B receiving area ERb.

Next the processing flow of the monitoring module 132 (FIG. 7) will be described with reference to FIG. 13.

[Processing Flow of Monitoring Module 132]

Figure 13:
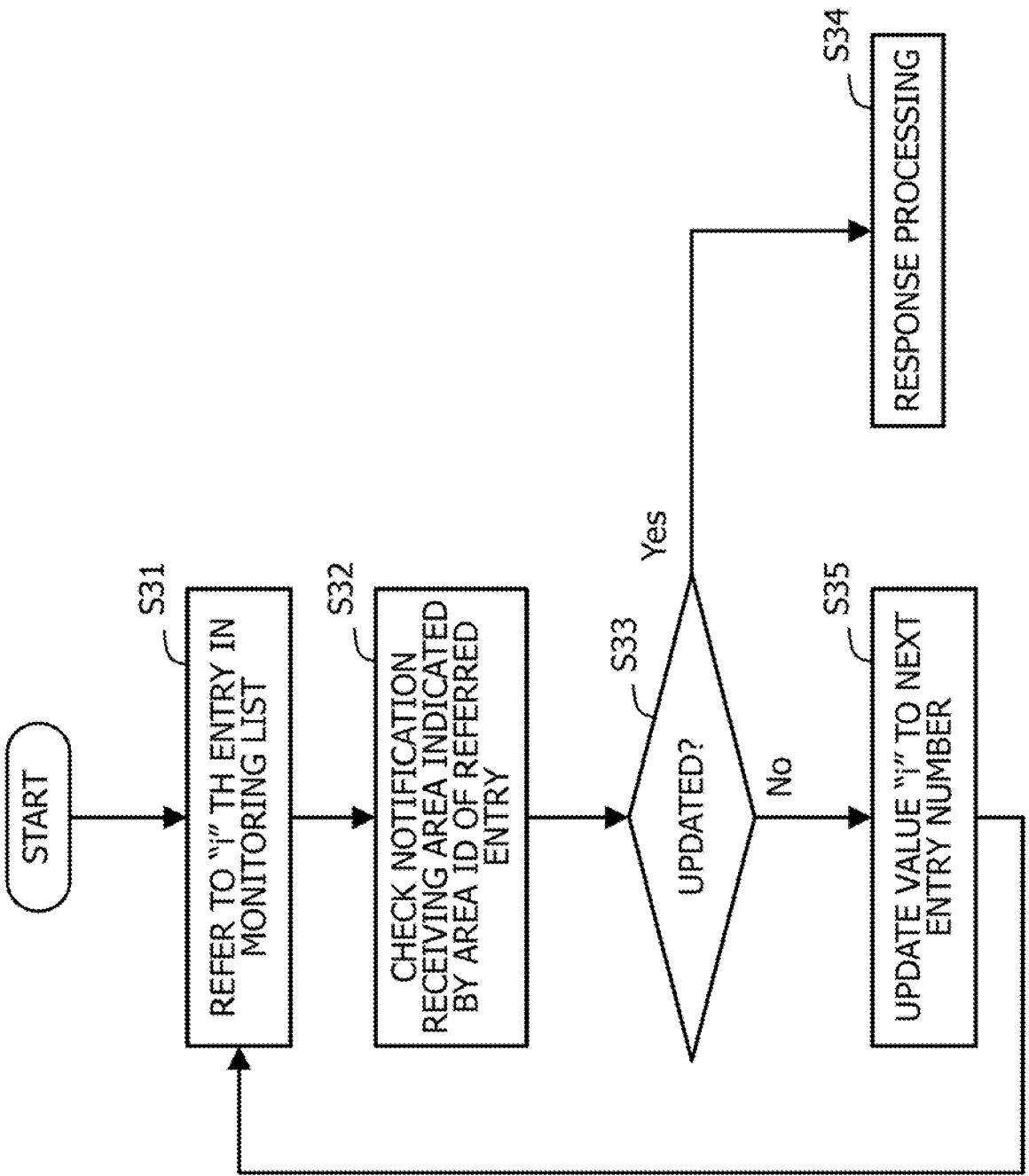
FIG. 13 is a flow chart depicting the processing flow by the monitoring module 132 of the notification monitoring program 120 depicted in FIG. 7.

FIG. 13 is a flow chart depicting the processing flow by the monitoring module 132 of the notification monitoring program 120 depicted in FIG. 7.

S31: The monitoring module 132 refers to the "i"th entry in the monitoring list ml.

S32: The monitoring module 132 checks the notification receiving area ER indicated by the area ID of the "i"th entry referred to in step S31. For example, if "i=1", then the monitoring module 132 checks the notification A receiving area ERa based on the monitoring list ml in FIG. 12.

S33: The monitoring module 132 determines whether the notification receiving area ER has changed to a predetermined state. In other words, the monitoring module 132 determines whether the notification receiving area ER has been updated by the notification corresponding to this notification receiving area ER.

S34: If the notification receiving area ER has changed to the predetermined state (YES in S33), the monitoring module 132 performs the response processing corresponding to the notification receiving area ER. For example, if it is detected that the notification A receiving area ERa has been updated by the notification A, the monitoring module 132 clears the standby state of the thread thA (FIG. 1).

S35: If the notification receiving area ER has not changed to the predetermined state (NO in S33), the monitoring module 132 updates the value "i" to a number of the next entry of the monitoring list ml. In this way, the monitoring module 132 polls and monitors a plurality of monitoring targets according to the listing order of the monitoring targets in the monitoring list ml.

As described above, the monitoring module 132 can unequalize the monitoring frequency of each notification receiving area ER by polling the monitoring targets according to the listing order in the monitoring list ml, where the appearance frequency is not equal depending on the notification receiving area ER. Thereby the monitoring module 132 can more frequently monitor a notification receiving area ER having high appearance frequency, and can decrease the response time for this notification receiving area ER.

Embodiment 2

In Embodiment 1, the case of creating the monitoring list ml, which includes only the notification receiving areas ER, was described. The monitoring list according to Embodiment 2, on the other hand, includes an entry which indicates an NOP instruction, in addition to the notification receiving areas ER.

The NOP instruction instructs the CPU 101 (FIG. 6) not to execute processing for a predetermined number of clocks. In Embodiment 2, the predetermined number of clocks is the number of clocks used for checking whether one notification receiving area ER has been updated by the notification. Thereby the monitoring module has a timing in which processing is not performed while monitoring is performed for the notification receiving areas ER. Therefore power consumption of the information processing apparatus 100 can be conserved.

The hardware configuration of the information processing apparatus 100 according to Embodiment 2 is basically the same as that of Embodiment 1 illustrated in FIG. 6. The difference is that the auxiliary storage apparatus 111 of the information processing apparatus 100 according to Embodiment 2 further includes an area for storing power saving degree information.

The power saving degree information is a value which indicates a degree of power saving by the CPU 101 of the information processing apparatus 100, and indicates that power consumption can be conserved even more as the value of the degree is greater. The power saving degree information is inputted in advance by a system administrator or the like.

The software functions of the information processing apparatus 100 according to Embodiment 2 are basically the same as Embodiment 1 illustrated in FIG. 7. A difference is that the notification monitoring program 120 according to Embodiment 2 further refers to the power saving degree information.

[Monitoring List ml-2]

Figure 14:
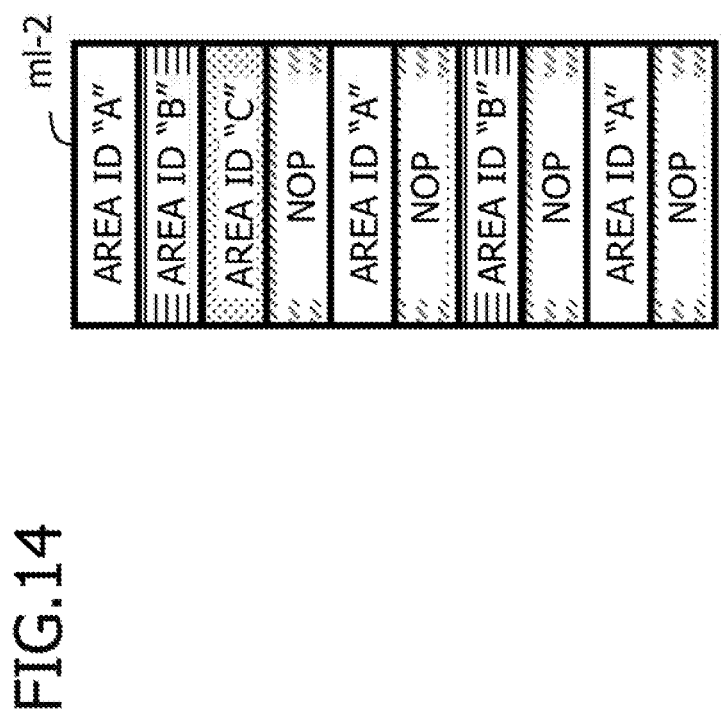
FIG. 14 is an example of a monitoring list ml-2 according to Embodiment 2.

FIG. 14 is an example of a monitoring list ml-2 according to Embodiment 2. As illustrated in FIG. 14, the monitoring list ml-2 according to Embodiment 2 includes a value "NOP", which indicates that monitoring processing of the notification receiving areas ER is not performed, in addition to the area IDs "A" to "E".

According to the monitoring list ml-2 in FIG. 14, the value "NOP" is included in the fourth, sixth, eighth and tenth entries. Thereby the monitoring module 132 sends the NOP instruction to the CPU 101 after monitoring the notification A receiving area ERa, the notification B receiving area ERb, and the notification C receiving area ERc.

After sending the NOP instruction and monitoring the notification A receiving area ERa, the monitoring module 132 sends the NOP instruction again. In this way, according to the monitoring list ml-2 of Embodiment 2, the monitoring module 132 instructs the NOP instruction while monitoring the notification receiving area ER. Thereby the information processing apparatus 100 according to Embodiment 2 can make the monitoring frequency of each notification receiving area ER different, and implement conservation of power consumption in accordance with the power saving degree.

According to Embodiment 2, power saving can be implemented by controlling the CPU 101 for each clock. Therefore, it is possible to control the state of the CPU 101 according to finer precision as compared with the case of using a sleep instruction, timer interrupt or the like. Therefore the information processing apparatus 100 according to Embodiment 2 can implement power saving of the information processing apparatus 100 more flexibly.

[Processing Flow of List Creation Module 131]

Figure 15:
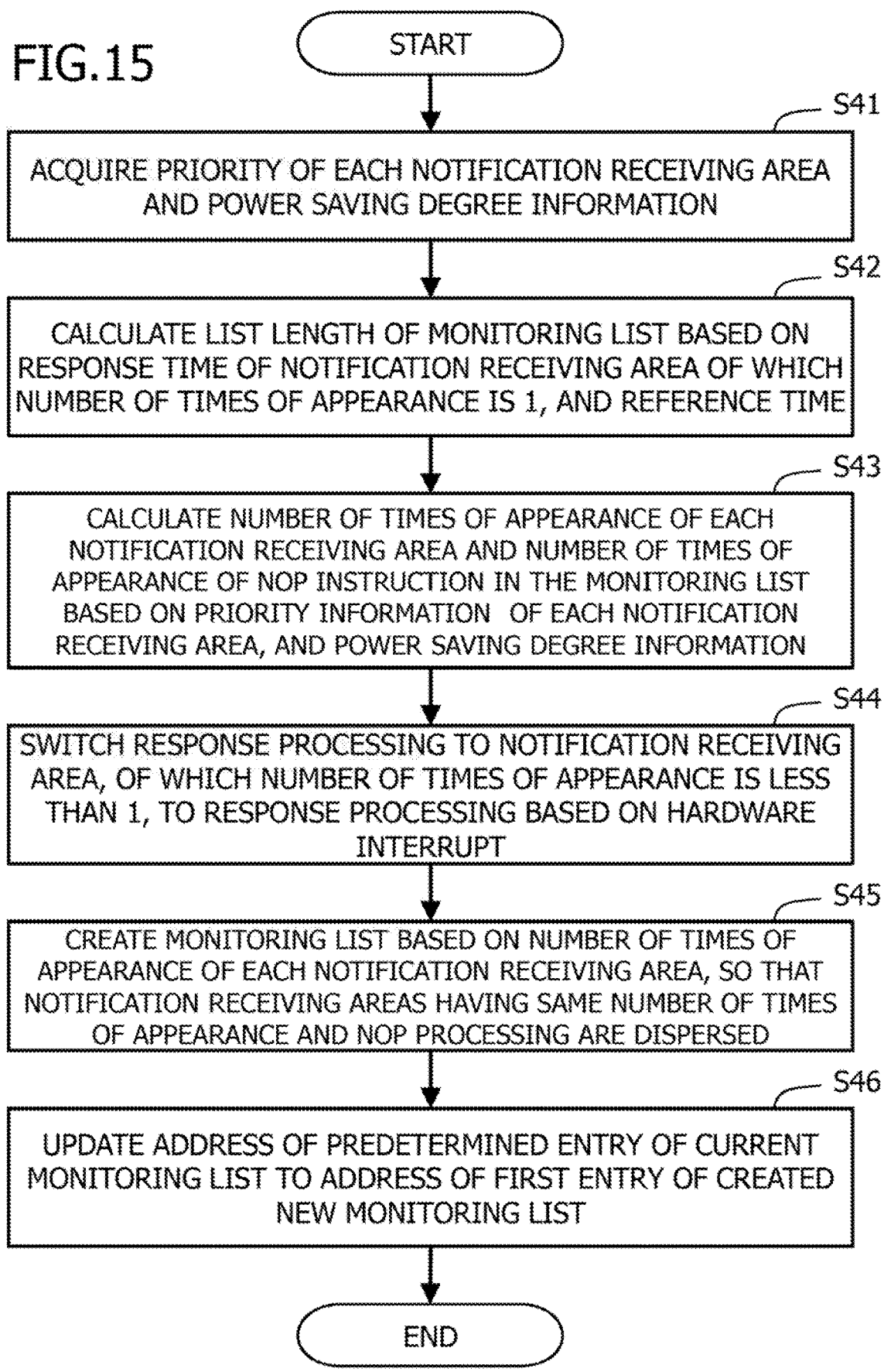
FIG. 15 is a flow chart depicting a processing flow by the list creation module 131 of a notification monitoring program 120 according to Embodiment 2.

FIG. 15 is a flow chart depicting a processing flow by the list creation module 131 of a notification monitoring program 120 according to Embodiment 2.

S41: The number of times of appearance determination module 142 according to Embodiment 2 acquires power saving degree information in addition to the priority information 121 of each notification receiving area ER, and instructs the list length determination module 141 to execute the list length determination processing.

S42: The list length determination module 141 calculates the list length of the monitoring list ml-2 based on the response time to the notification receiving area ER, of which number of times of appearance in the monitoring list ml-2 is 1, and the reference time, in the same manner as Embodiment 1.

S43: The number of times of appearance determination module 142 calculates the number of times of appearance of the NOP instruction, in addition to the number of times of appearance of each notification receiving area ER based on the priority information 121 of each notification receiving area ER and the power saving degree information. The method for calculating the number of times of appearance is the same as Embodiment 1. Details on the processing will be described later with reference to FIG. 16.

S44: The number of times of appearance determination module 142 switches the response processing to a notification receiving area ER, of which number of times of appearance calculated in step S43 is less than 1, to the response processing by hardware interrupt, in the same manner as Embodiment 1.

S45: The list order determination module 143 creates the monitoring list ml-2 based on the number of times of appearance of each, notification receiving area ER and the number of times of appearance of the NOP instruction, so that the entries of the same notification receiving areas ER and the NOP instructions are dispersed. Details on the processing are the same as Embodiment 1.

S46: The list order determination module 143 updates the address of a predetermined entry in the current monitoring list ml-2 to the address of the first entry of the created-new monitoring list ml-2, in the same manner as Embodiment 1.

In this way, the list creation module 131 according to Embodiment 2 creates the monitoring list ml-2, in which the appearance frequency of the NOP instruction changes in accordance with the power saving degree, utilizing the monitoring list ml-2 in which the appearance frequency of each monitoring target is different. Thereby the list creation module 131 can create the monitoring list ml-2 having entries of the NOP instruction of which number of times of appearance is in accordance with the power saving degree.

Example

FIG. 16 is a table for explaining an example of the processing by the notification monitoring program 120 according to Embodiment 2. Table H4 in FIG. 16 includes priority coefficients, number of times of appearance, and number of steps for the notification A receiving area ERa to the notification C receiving area ERc, and the power saving degree. The priority coefficient of each notification receiving area. ER corresponds to the priority information 121. The number of times of appearance and the number of steps are as described in Embodiment 1.

The number of times of appearance determination module 142 acquires the priority information 121 and the power saving degree information (S41 in FIG. 15). According to Table H4, the priority coefficient of the notification A receiving area ERa is value "0.3", the priority coefficient of the notification B receiving area ERb is value "0.2", and the priority coefficient of the notification C receiving area ERc is value "0.1". The priority coefficient of the power saving degree is value "0.4". The priority coefficients of each notification receiving area ER and the power saving degree are normalized so that the total value becomes "1".

The list length determination module 141 calculates the list length "10" of the monitoring list ml-2 in the same manner as Embodiment 1 (S42). Then the number of times of appearance determination module 142 calculates the number of times of appearance of each notification receiving area ER and the number of times of appearance of the NOP instruction (S43).

The number of times of appearance determination module 142 calculates the number of times of appearance "3" of the notification A receiving area ERa based on the expression "(0.3/1)*10". In the same manner, the number of times of appearance determination module 142 calculates the number of times of appearance "2" of the notification B receiving area ERb, and the number of times of appearance "1" of the notification C receiving area ERc as indicated in Table H4. Furthermore, the number of times of appearance determination module 142 calculates the number of times of appearance of the NOP instruction, which is "4(=(0.4/1)*10)" based on the power saving degree "0.4".

The list order determination module 143 creates the monitoring list ml-2 so that the same notification receiving areas ER and the NOP instructions are dispersed (S45). The list order determination module 143 calculates the number of steps for each notification receiving area ER and the power saving degree (NOP instruction) in the same manner as Embodiment 1.

In concrete terms, as illustrated in Table H4, the list order determination module 143 calculates the number of steps "4" of the notification A receiving area ERa, the number of steps "5" of the notification B receiving area ERb, and the number of steps "10" of the notification C receiving area ERc. Furthermore, the list order determination module 143 calculates the number of steps "3" of the power saving degree.

Then the list order determination module 143 creates the monitoring list ml-2 in FIG. 14, in the same manner as Embodiment 1. The list order determination module 143 arranges the entries in the monitoring list ml, assigning priority to the notification receiving area ER over the NOP instruction.

In the example of FIG. 15 and FIG. 16, the list order determination module 143 creates the monitoring list ml-2, so that the entries of the NOP instruction are dispersed in the monitoring list ml-2. However, the list order determination module 143 may create the monitoring list ml-2 so that the entries of the NOP instruction are consecutive.

In this case, the list order determination module 143 replaces a plurality of entries of the NOP instruction, which are consecutive in the monitoring list ml-2 with an entry indicating one delay processing. Thereby the list order determination module 143 instructs the delay processing instead of the plurality of NOP instructions, so as to execute the delay processing for the period, which is equivalent to the plurality of NOP instructions.

In concrete terms, if 2 entries of the NOP instruction are consecutive in the monitoring list ml-2, these 2 entries are replaced with one delay (2) instruction. In this case, the monitoring module 132 omits referring to the monitoring list ml-2 and instructing one NOP instruction. Therefore the power saving degree of the information processing apparatus 100 can be further improved.

[Processing Flow by Monitoring Module 132]

Figure 17:
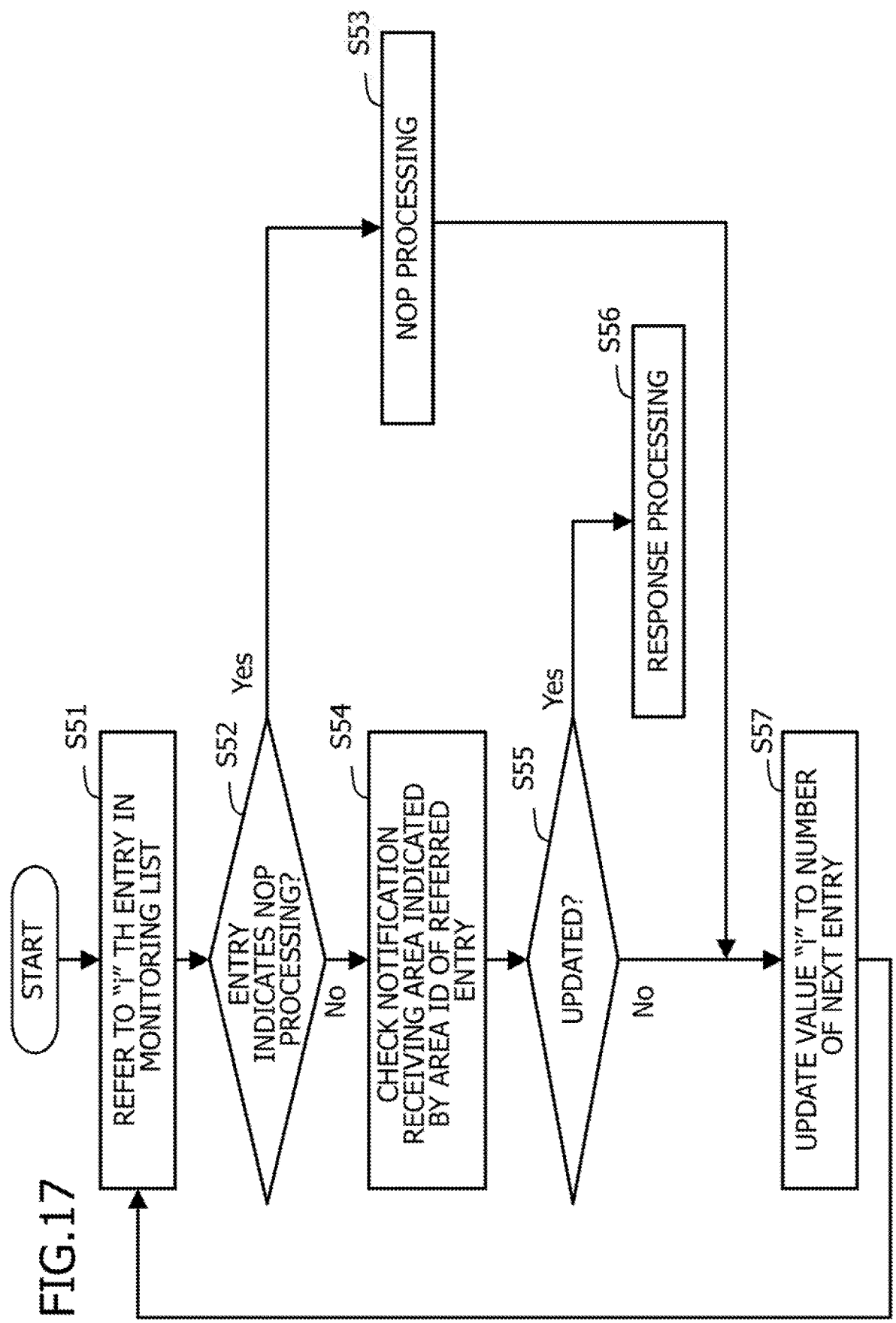
FIG. 17 is a flow chart depicting the processing flow of the monitoring module 132 of the notification monitoring program 120 according to Embodiment 2.

FIG. 17 is a flow chart depicting the processing flow of the monitoring module 132 of the notification monitoring program 120 according to Embodiment 2.

S51: The monitoring module 132 refers to the "i"th entry of the monitoring list ml-2.

S52: The monitoring module 132 determines whether the "i"th entry, referred to in step S51, is an entry indicating the NOP instruction.

S53: If the "i"th entry is an entry which indicates the NOP instruction (YES in S52), the monitoring module 132 instructs execution of the NOP instruction. In the case when the monitoring list ml includes an entry of the delay instruction, the monitoring module 132 instructs execution of the delay instruction based on, an argument when the entry indicating that the delay instruction.

S54: If the "i"th entry is not an entry which indicates the NOP instruction (NO in S52), the monitoring module 132 checks the notification receiving area ER indicated by the area ID of the "i"th entry referred to in step S51.

S55: The monitoring module 132 determines whether the notification receiving area ER has changed to a predetermined state. In other words, the monitoring module 132 determines whether the notification receiving area ER has been updated by the notification corresponding to this notification receiving area ER.

S56: If the notification receiving area ER has changed to the predetermined state (YES in S55), the monitoring module 132 executes the response processing corresponding to the notification receiving area ER.

S57: If the notification receiving area ER has not changed to the predetermined state (NO in S55), the monitoring module 132 instructs execution of the NOP instruction (S53), then updates the value "i" to the number of the next entry in the monitoring list ml-2. In this way, the monitoring module 132 polls and monitors a plurality of monitoring targets according to the listing order in the monitoring list ml-2.

As described above, the monitoring module 132 can unequalize the monitoring frequency of each notification receiving area ER by polling the monitoring targets according to the listing order in the monitoring list ml-2, where the appearance frequency is not equal different depending on the notification receiving area ER. Thereby the monitoring module 132 can more frequently monitor a notification receiving area ER having high appearance frequency, and can decrease the response time for this notification receiving area ER.

All examples and conditional language provided herein are intended for the pedagogical purposes of aiding the reader in understanding the invention and the concepts contributed by the inventor to further the art, and are not to be construed as limitations to such specifically recited, examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a memory; and
a processor coupled to the memory and the processor configured to:
create a monitoring list in accordance with monitoring targets in which appearance frequency of a first monitoring target is higher than appearance frequency of a second monitoring target in the monitoring list when priority of the first monitoring target is higher than priority of the second monitoring target; and
monitor a plurality of monitoring targets by polling for monitoring targets in the monitoring list in order of the list,
the processor calculates a total number of monitoring targets in the list so that a response time, which is a total of a first time from a change in the state of a monitoring target of which the number of times of appearance in the monitoring list is 1 to a predetermined state up to detection of the change, and a second time from the detection of the change up to the start of a response processing, is shorter than a predetermined reference time that is a time from generation of a hardware interrupt in response to a processing to change a state of the monitoring target to the predetermined state up to the execution of the response processing, calculates the number of times of appearance of each of the plurality of monitoring targets by calculating, for each of the plurality of monitoring targets, the product of a total number of listed monitoring targets of the monitoring list and a ratio calculated by dividing a value corresponding to the priority of each monitoring target by a sum of values corresponding to the priority of each of the plurality of monitoring targets and creates the monitoring list so as to not include information indicating a monitoring target of which the calculated number of times of appearance is less than 1 in the monitoring list.

2. The information processing apparatus according to claim 1, wherein an appearance frequency of the first monitoring target in the monitoring list is 2 or more.

3. The information processing apparatus according to claim 1, wherein the processor registers instruction information to instruct the generation of a hardware interrupt, in response to the processing to change the state a monitoring target, of which calculated number of appearance is less than 1, to the predetermined state.

4. The information processing apparatus according to claim 1, wherein the predetermined reference time indicates a time from the generation of a hardware interrupt in response to the processing to change the state of the monitoring target to the predetermined state, up to the execution of the response processing.

5. The information processing apparatus according to claim 3, wherein
the monitoring target includes a predetermined area, and
the predetermined state includes a state in which the predetermined area has been updated by a notification.

6. The information processing apparatus according to claim 1, wherein
the monitoring target includes a predetermined area, and
the predetermined state includes a state in which the predetermined area has been updated by a notification.

7. A non-transitory computer-readable storage medium storing therein a notification monitoring program for causing a computer to execute processing comprising:
creating a monitoring list in accordance with monitoring targets in which appearance frequency of a first monitoring target is higher than appearance frequency of a second monitoring target in the monitoring list when priority of the first monitoring target is higher than priority of the second monitoring target; and
monitoring a plurality of monitoring targets by polling for monitoring targets in the monitoring list in order of the list,
the creating includes calculating a total number of monitoring targets in the list so that a response time, which is a total of a first time from a change in the state of a monitoring target of which the number of times of appearance in the monitoring list is 1 to a predetermined state up to detection of the change, and a second time from the detection of the change up to the start of a response processing, is shorter than a predetermined reference time that is a time from generation of a hardware interrupt in response to a processing to change a state of the monitoring target to the predetermined state up to the execution of the response processing, calculating the number of times of appearance of each of the plurality of monitoring targets by calculating, for each of the plurality of monitoring targets, the product of a total number of listed monitoring targets of the monitoring list and a ratio calculated by dividing a value corresponding to the priority of each monitoring target by a sum of values corresponding to the priority of each of the plurality of monitoring targets and creating the monitoring list so as to not include information indicating a monitoring target of which the calculated number of times of appearance is less than 1 in the monitoring list.

8. A notification monitoring method comprising:
creating, by a processor, a monitoring list in accordance with monitoring targets in which appearance frequency of a first monitoring target is higher than appearance frequency of a second monitoring target in the monitoring list when priority of the first monitoring target is higher than priority of the second monitoring target; and
monitoring, by the processor, a plurality of monitoring targets by polling for monitoring targets in the monitoring list in order of the list,
the creating includes calculating a total number of monitoring targets in the list so that a response time, which is a total of a first time from a change in the state of a monitoring target of which the number of times of appearance in the monitoring list is 1 to a predetermined state up to detection of the change, and a second time from the detection of the change up to the start of a response processing, is shorter than a predetermined reference time that is a time from generation of a hardware interrupt in response to a processing to change a state of the monitoring target to the predetermined state up to the execution of the response processing, calculating the number of times of appearance of each of the plurality of monitoring targets by calculating, for each of the plurality of monitoring targets, the product of a total number of listed monitoring targets of the monitoring list and a ratio calculated by dividing a value corresponding to the priority of each monitoring target by a sum of values corresponding to the priority of each of the plurality of monitoring targets and creating the monitoring list so as to not include information indicating a monitoring target of which the calculated number of times of appearance is less than 1 in the monitoring list.

* * * * *